(12) United States Patent
Kusakabe et al.

(10) Patent No.: US 10,731,615 B2
(45) Date of Patent: Aug. 4, 2020

(54) FLOW RATE CONTROL VALVE AND HIGH-PRESSURE FUEL SUPPLY PUMP

(71) Applicant: Hitachi Automotive Systems, Ltd., Hitachinaka-shi, Ibaraki (JP)

(72) Inventors: Ryo Kusakabe, Hitachinaka (JP); Kenichiro Tokuo, Hitachinaka (JP); Satoshi Usui, Hitachinaka (JP); Minoru Hashida, Hitachinaka (JP); Masayuki Suganami, Hitachinaka (JP); Atsushi Hohkita, Hitachinaka (JP); Eiichi Kubota, Hitachinaka (JP); Daisuke Kitajima, Hitachinaka (JP); Hiroshi Horie, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 242 days.

(21) Appl. No.: 15/736,464

(22) PCT Filed: Jun. 3, 2016

(86) PCT No.: PCT/JP2016/066525
§ 371 (c)(1),
(2) Date: Dec. 14, 2017

(87) PCT Pub. No.: WO2016/208359
PCT Pub. Date: Dec. 29, 2016

(65) Prior Publication Data
US 2018/0135579 A1 May 17, 2018

(30) Foreign Application Priority Data
Jun. 25, 2015 (JP) .................. 2015-127207

(51) Int. Cl.
*F02M 59/36* (2006.01)
*F02M 51/00* (2006.01)
(Continued)

(52) U.S. Cl.
CPC .......... *F02M 59/366* (2013.01); *F02M 51/00* (2013.01); *F02M 59/02* (2013.01);
(Continued)

(58) Field of Classification Search
CPC .... F02M 59/366; F02M 59/466; F02M 59/36; F02M 59/02; F02M 51/00; H01F 7/16;
(Continued)

(56) References Cited

U.S. PATENT DOCUMENTS 5,135,027 A * 8/1992 Miki .................. F16K 31/0631
137/596.17
5,791,630 A * 8/1998 Nakao .................. F02M 23/006
251/129.19
(Continued)

FOREIGN PATENT DOCUMENTS

DE 10 2013 202 965 A1 8/2013
DE 11 2013 000 957 T5 12/2014
(Continued)

OTHER PUBLICATIONS

Translation of JP2002188744, Yasuda et al, May 7, 2002, JPO. (Year: 2002).*
(Continued)

*Primary Examiner* — Charles G Freay
(74) *Attorney, Agent, or Firm* — Crowell & Moring LLP

(57) ABSTRACT

Responsiveness of an electromagnetic flow-rate control valve provided for closing a suction valve is improved and a discharge flow rate is controlled to a desired value. A flow-rate control valve includes a fixed core arranged on an inner circumferential side of a coil, a yoke arranged on an outer circumferential side of the coil, and a cover portion opposed to the coil in an axial direction, in which the fixed core has an enlarged portion in contact with the cover portion in the axial direction and enlarging toward the coil,
(Continued)

and the cover portion is regulated in the axial direction only by a contact portion with the fixed core.

18 Claims, 11 Drawing Sheets

(51) Int. Cl.
    *F02M 59/46*     (2006.01)
    *F02M 59/02*     (2006.01)
    *F16K 31/06*     (2006.01)
    *H01F 7/16*     (2006.01)

(52) U.S. Cl.
    CPC .......... *F02M 59/36* (2013.01); *F02M 59/466* (2013.01); *F16K 31/06* (2013.01); *F16K 31/0655* (2013.01); *F16K 31/0675* (2013.01); *H01F 7/16* (2013.01)

(58) Field of Classification Search
    CPC .. F16K 31/06; F16K 31/0675; F16K 31/0655; F04B 7/0076
    See application file for complete search history.

(56) References Cited

U.S. PATENT DOCUMENTS

| | | | | |
|---|---|---|---|---|
| 5,897,096 | A * | 4/1999 | Nakano | F02M 3/075 251/129.15 |
| 6,418,867 | B1 * | 7/2002 | Erickson | A23K 50/70 111/200 |
| 2006/0239846 | A1 * | 10/2006 | Oda | F02M 59/464 417/505 |
| 2013/0075644 | A1 | 3/2013 | Suzuki et al. | |
| 2014/0158921 | A1 | 6/2014 | Ishibashi et al. | |
| 2015/0001318 | A1 | 1/2015 | Honjo | |

FOREIGN PATENT DOCUMENTS

| | | |
|---|---|---|
| EP | 2 492 559 A1 | 8/2012 |
| JP | 2002-188744 A | 7/2002 |
| JP | 2010-275893 A | 12/2010 |
| JP | 2012-154478 A | 8/2012 |
| JP | 2014-105758 A | 6/2014 |

OTHER PUBLICATIONS

International Search Report (PCT/ISA/210) issued in PCT Application No. PCT/JP2016/066525 dated Jul. 26, 2016 with English translation (Two (2) pages).

Japanese-language Written Opinion (PCT/ISA/237) issued in PCT Application No. PCT/JP2016/066525 dated Jul. 26, 2016 (Four (4) pages).

Extended European Search Report issued in counterpart European Application No. 16814130.7 dated Nov. 15, 2018 (nine pages).

Communication pursuant to Article 94(3) EPC issued in counterpart European Application No. 16 814 130.7 dated Dec. 5, 2019 (five(5) pages).

* cited by examiner

FLOW RATE CONTROL VALVE AND HIGH-PRESSURE FUEL SUPPLY PUMP

TECHNICAL FIELD

The present invention relates to a high-pressure fuel supply pump for pressure-feeding fuel to a fuel injection valve of an internal combustion engine, and more particularly to a high-pressure fuel pump having a flow-rate control valve for adjusting the amount of fuel to be discharged.

BACKGROUND ART

In an internal combustion engine of an automobile or the like, there have been widely used a direct injection high-pressure fuel pump which injects fuel directly into a combustion chamber and has a flow-rate control valve for increasing the pressure of the fuel and discharging a desired fuel flow rate.

Generally, as the pressure supplied to a fuel injector is larger, the fuel spray injected from the fuel injector is more atomized, and the combustion efficiency is improved. Thus, high discharge pressure is required as the performance of a high-pressure fuel pump. Furthermore, in order to control the flow rate under the condition of high engine speed, it is necessary to open and close the flow-rate control valve within a predetermined time, and improvement in the responsiveness of the flow-rate control valve is required.

PTL 1 discloses a method as a driving portion structure for improving the responsiveness of the flow-rate control valve. PTL 1 discloses a method for increasing the magnetic attraction force and improving the responsiveness by setting the saturation magnetic flux density of the stainless steel forming a fixed core and a movable core larger than the saturation magnetic flux density of the stainless steel forming a case.

CITATION LIST

Patent Literature

PTL 1: JP 2012-154478 A

SUMMARY OF INVENTION

Technical Problem

In a flow-rate control valve for a normal-open high-pressure fuel pump which connects a pressurizing chamber with a flow-rate control valve while energizing a coil is being stopped, it is necessary to close a suction valve at a predetermined timing in order to control the flow rate to be discharged to a fuel injector.

Furthermore, it is necessary to close the suction valve from the valve opening state until a pressurizing piston for pressurizing the fuel starts the compression stroke after the fuel is sucked into the pressurizing chamber, and to shorten the time required for closing the valve since the speed of the pressurizing piston is increased as the rotation speed of the engine is increased.

A purpose of the present invention is to improve responsiveness of an electromagnetic flow-rate control valve provided for closing a suction valve to control a discharge flow rate to a desired value.

Solution to Problem

In order to solve the above problem, a flow-rate control valve for a high-pressure pump of the present invention includes a fixed core arranged on an inner circumferential side of a coil, a yoke arranged on an outer circumferential side of the coil, and a cover portion opposed to the coil in an axial direction, in which the fixed core has an enlarged portion in contact with the cover portion in the axial direction and enlarging toward an outer circumferential side of the coil, and the cover portion is regulated in the axial direction only by a contact portion with the fixed core.

Advantageous Effects of Invention

According to the present invention, it is possible to improve responsiveness of an electromagnetic flow-rate control valve provided for closing a suction valve, and to control a discharge flow rate to a desired value.

BRIEF DESCRIPTION OF DRAWINGS

FIGS. 7A to 7F are diagrams showing a time chart indicating states or the like of parts in each process in a pump operation.

DESCRIPTION OF EMBODIMENTS

Embodiments of the present invention will be described below with reference to the drawings.

First Embodiment

Figure 1:
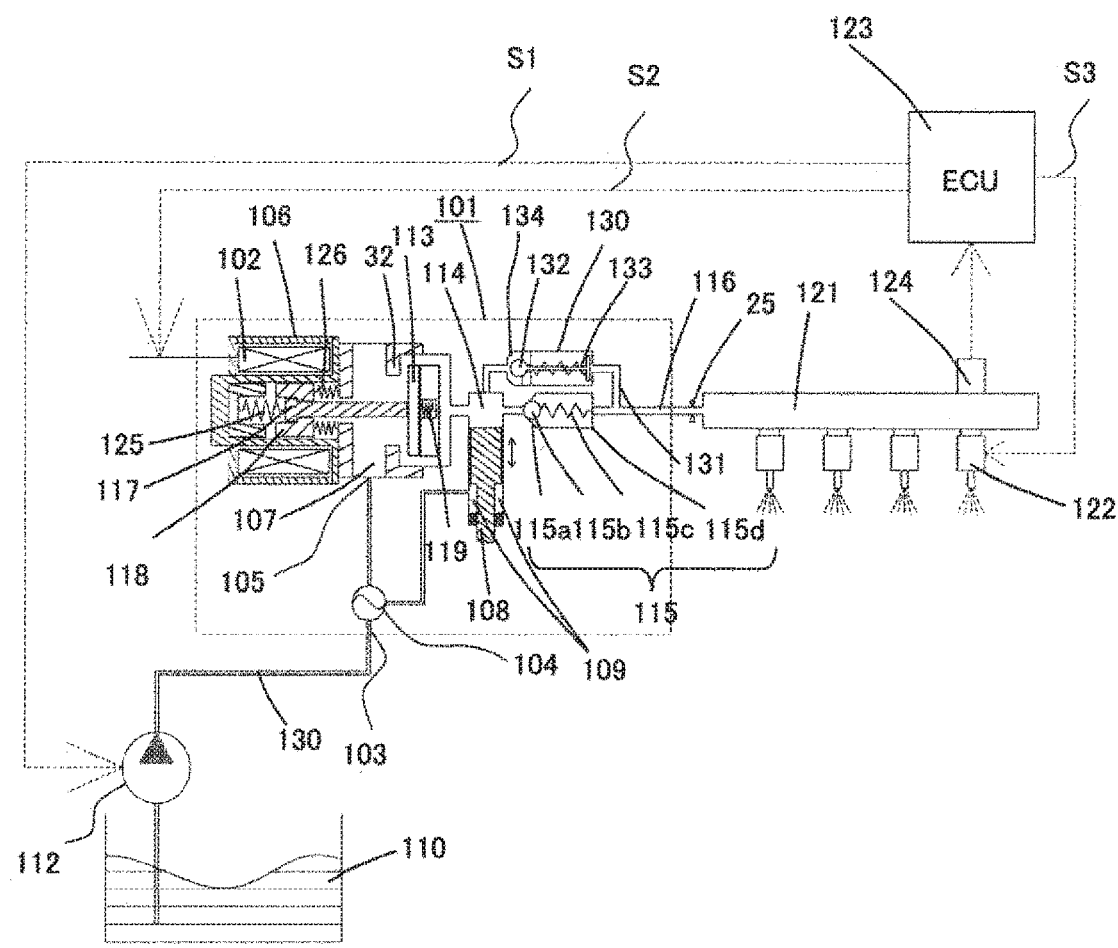
FIG. 1 is a diagram showing an example of an entire configuration of a fuel supply system including a high-pressure fuel supply pump to which the present invention is applicable.
Figure 2:
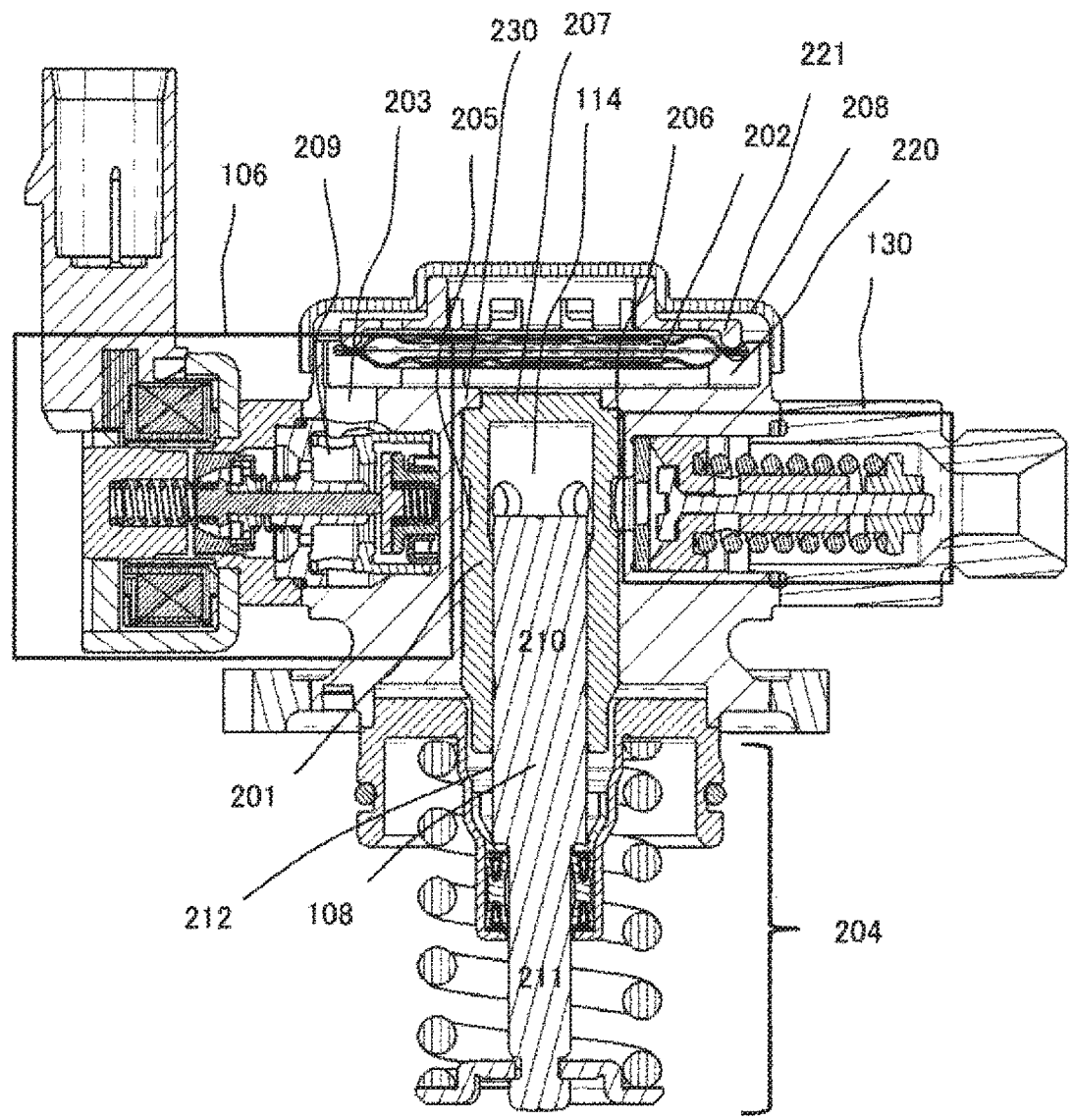
FIG. 2 is a diagram showing a specific example of a high-pressure fuel supply pump main body 101 mechanically integrally configured in a first embodiment.

Hereinafter, a first embodiment of a high-pressure fuel pump according to the present invention will be described with reference to FIGS. 1 to 7. FIG. 1 is a diagram showing an example of an entire configuration of a fuel supply system including a high-pressure fuel supply pump in the present embodiment. FIG. 2 is a cross-sectional view of a high-pressure fuel pump main body in the present embodiment. In FIG. 2, the same reference signs are used for constituent parts equivalent to those in FIG. 1.

In FIG. 1, a portion 101 surrounded by a broken line shows the high-pressure fuel supply pump main body, and the mechanisms and parts shown surrounded by this broken line are integrated in a high-pressure fuel supply pump main body 101. Fuel is fed from a fuel tank 110 into the high-pressure fuel supply pump main body 101 through a feed pump 111, and the pressurized fuel is fed from the high-pressure fuel supply pump main body 101 to a fuel injector 122 through a common rail 121. An engine control unit 123 takes in the pressure of the fuel from a pressure sensor 124 and controls the feed pump 111, an electromagnetic coil 102 (solenoid) in the high-pressure fuel supply pump main body 101, and the fuel injector 122 to optimize the pressure.

In FIG. 1, the fuel in the fuel tank 110 is pumped up by the feed pump 111 based on a control signal S1 from the engine control unit 123, is pressurized to an appropriate feed pressure, and is fed to a low-pressure fuel suction port (suction joint) 103 of the high-pressure fuel supply pump 101 through a suction pipe 112. The fuel having passed through the low-pressure fuel suction port 103 reaches a suction port 107 of the flow-rate control valve 106 constituting a capacity varying mechanism through a pressure pulsation reducing mechanism 104 and a suction passage 105. The pressure pulsation reducing mechanism 104 communicates with an annular low-pressure fuel chamber 109, which varies the pressure in conjunction with a plunger 108 performing a reciprocating motion by a cam mechanism (not shown) of the engine, and thereby reduces the pulsation of the pressure of the fuel to be sucked into the suction port 107 of the flow-rate control valve 106.

The fuel flowing into the suction port 107 of the flow-rate control valve 106 passes through a suction valve 113 and flows into a pressurizing chamber 114. The valve position of the suction valve 113 is determined by controlling an electromagnetic coil 106 in the high-pressure fuel supply pump main body 101 based on a control signal S2 from the engine control unit 123. In the pressurizing chamber 114, the cam mechanism (not shown) of the engine applies power for reciprocating to the plunger 108. By the reciprocating motion of the plunger 108, the fuel is sucked from the suction valve 113 during a lowering process of the plunger 108, and the sucked fuel is pressurized during a rising process of the plunger 108, and is pressure-fed through a discharge valve mechanism 115 to the common rail 121 equipped with the pressure sensor 124. Thereafter, the fuel is injected by the fuel injector 122 to the engine based on a control signal S3 from the engine control unit 123.

The discharge valve mechanism 115 provided at the outlet of the pressurizing chamber 114 includes a discharge valve seat 115a, a discharge valve 115b which comes into contact with and separates from the discharge valve seat 115a, a discharge valve spring 115c which biases the discharge valve 115b toward the discharge valve seat 115a, and the like. When the internal pressure of the pressurizing chamber 114 is higher than the pressure on a discharge passage 116 side which is the downstream side of the discharge valve 115b and overcomes the resistance determined by the discharge valve spring 115c, the discharge valve 115b is opened and the pressurized fuel is pressure-fed and supplied from the pressurizing chamber 114 toward the discharge passage 116.

The parts constituting the flow-rate control valve 106 in FIG. 1 are a suction valve 113, a rod 117 for controlling the position of the suction valve 113, a movable portion 442, an anchor sliding portion 441 fixed to the anchor portion 118 and sliding with the rod 117, a suction valve spring 119, a biasing spring 125 biasing the rod toward the suction valve 113, and an anchor portion biasing spring 126. The suction valve 113 is biased in the valve closing direction by the suction valve spring 119 and biased in the valve opening direction via the rod 117 by the rod biasing spring 125. The movable portion 442 is biased in the valve closing direction by the anchor portion biasing spring 126. The valve position of the suction valve 113 is controlled by driving the rod 117 by the solenoid 102. In the following description, the portion integrally constituted by the movable portion 442 and the anchor sliding portion 441 is referred to as the anchor portion 118.

In this manner, the solenoid 102 in the high-pressure fuel supply pump main body 101 is controlled by the control signal S2 transmitted from the engine control unit 123 to the flow-rate control valve 106, and the high-pressure fuel supply pump 101 thereby discharges the fuel flow rate so that the fuel to be pressure-fed through the discharge valve mechanism 115 to the common rail 121 is to be desired supply fuel.

In the high-pressure fuel supply pump 101, a relief valve 130 connects the pressurizing chamber 114 with the common rail 121. The relief valve 130 is a valve mechanism arranged in parallel with the discharge valve mechanism 115. When the pressure on the common rail 121 side rises over the set pressure of the relief valve 130, the relief valve 130 is opened and the fuel is returned into the pressurizing chamber 114 of the high-pressure fuel supply pump 101, whereby the abnormal high-pressure condition inside the common rail 121 is prevented.

The relief valve 130 forms a high-pressure flow passage 131 connecting the discharge passage 116 on the downstream side of the discharge valve 115b in the high-pressure fuel supply pump main body 101 with the pressurizing chamber 114, and bypasses the discharge valve 115b to the flow passage. The high-pressure flow passage 131 is provided with a relief valve 132 for restricting the flow of the fuel to one direction from the discharge flow passage 131 to the pressurizing chamber 114. The relief valve 132 is pressed against a relief valve seat 134 by a relief spring 133 which generates a pressing force, and is set to be opened when the pressure difference between the inside of the pressurizing chamber 114 and the inside of the high-pressure flow passage 131 exceeds a predetermined pressure determined by the relief spring 133 and the relief valve 130 separates from the relief valve seat 134.

Consequently, when the pressure of the common rail 121 becomes abnormally high due to failure or the like of the flow-rate control valve 106 of the high-pressure fuel supply pump 101 and when the pressure difference between the discharge flow passage 131 and the pressurizing chamber 114 becomes equal to or higher than the valve opening pressure of the relief valve 132, the relief valve 130 is opened and the abnormally high-pressure fuel is returned from the discharge flow passage 131 to the pressurizing chamber 114, whereby the high-pressure pipe such as the common rail 121 is protected.

FIG. 2 is a diagram showing a specific example of the high-pressure fuel supply pump main body 101 mechanically integrally configured. In FIG. 2, the plunger 108 performing a reciprocating motion in the height direction (in this case, a vertical motion) at the center of drawing by the cam mechanism (not shown) of the engine is arranged in the cylinder 201, and the pressurizing chamber 114 is formed in the cylinder 201 above the plunger 108.

Figure 3:
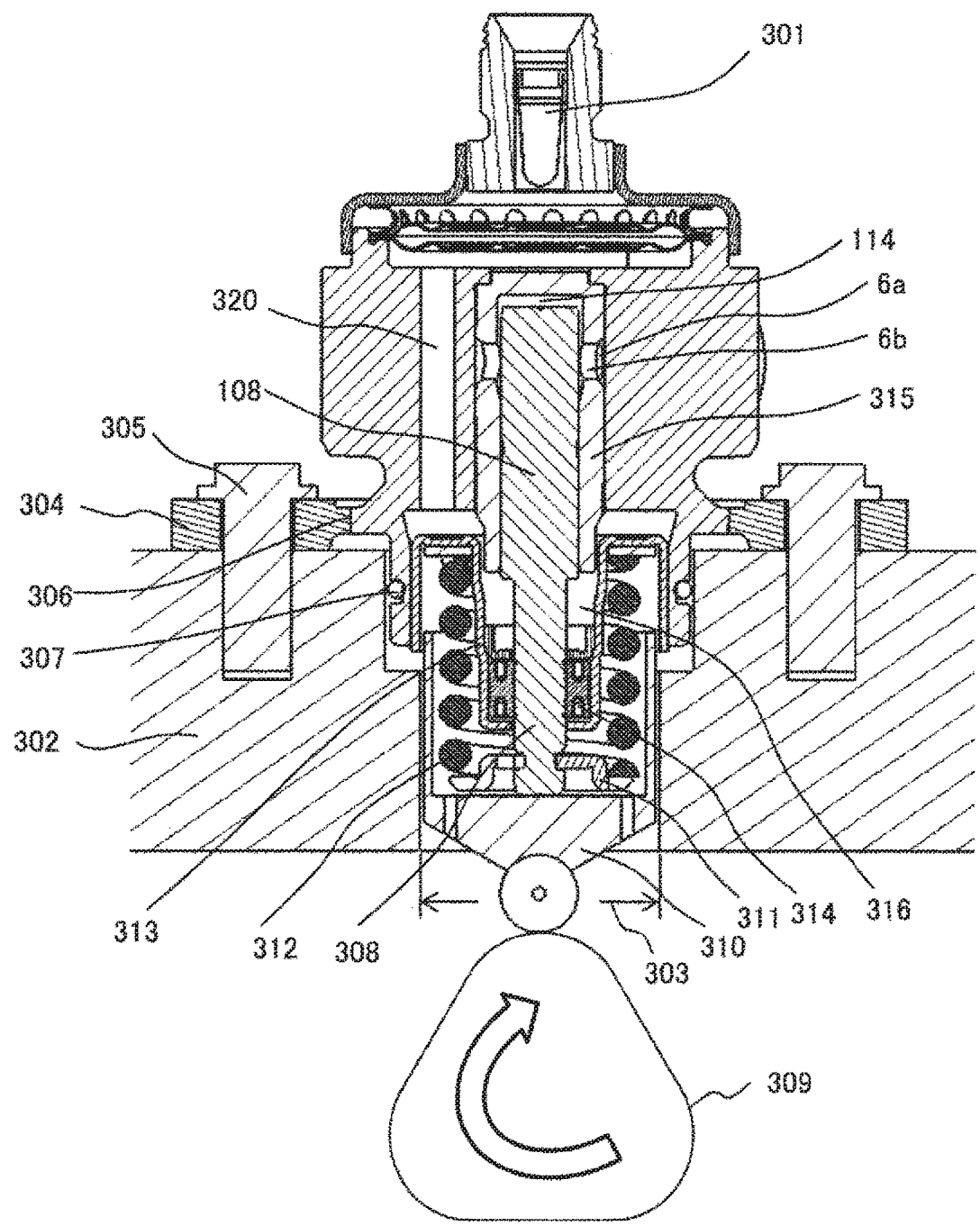
FIG. 3 is a diagram showing an installation root portion 204 being embedded and fixed in an internal combustion engine main body, and is an enlarged cross-sectional view of a driving portion structure of a fuel injector in the first embodiment of the present invention.

The mechanism on the flow control valve 106 side is arranged at the left side of the center of the drawing, and the mechanism of a relief 130 is arranged at the right side of the center of the drawing. At the upper part of the drawing, a low-pressure fuel suction port (not shown), a pressure pulsation reducing mechanism 202, a suction passage 203, and the like are arranged as a mechanism on the fuel suction side. At the center lower part of FIG. 1, a plunger internal combustion engine side mechanism 204 is shown. The plunger internal combustion engine side mechanism 204 is embedded and fixed in the internal combustion engine main body as shown in FIG. 3, and is referred to as an installation root portion accordingly. In the cross-section shown in FIG. 2, the low-pressure fuel suction port is not shown. The low-pressure fuel suction port can be shown in the cross-section from another angle, but is not directly related to the present invention, and the explanation and illustration thereof are omitted.

FIG. 3 shows the installation root portion (plunger internal combustion engine side mechanism) 204 being embedded and fixed in the internal combustion engine main body. However, in FIG. 3, the installation root portion 204 is shown at the center, and the illustration of other parts is omitted. In FIG. 3, the low-pressure fuel suction port 301 is positioned at the upper portion of the fuel pump main body, but a low-pressure fuel suction port 131 may be provided at the circumference having the cylinder 108 as the axis.

In FIG. 3, a thick portion of a cylinder head 302 of the internal combustion engine is shown. At the cylinder head 302 of the internal combustion engine, an installation root portion installing hole 303 having two-stage diameters according to the shape of the installation root portion 204 is formed. By inserting the installation root portion 204 into the installation root portion installing hole 303, the installation root portion 204 is airtightly fixed to the cylinder head 302 of the internal combustion engine.

In FIG. 3, the high-pressure fuel supply pump is tightly in contact with the flat face of the cylinder head 302 using a flange 304 provided at a pump main body 1, and is fixed by at least two or more bolts 305. The installation flange 304 is welded to the pump main body 1 at a welded portion 306 around its entire circumference by a laser, and an annular fixing portion is thereby formed. In order to seal the cylinder head 302 and the pump main body 1, an O-ring 307 is fitted on the pump main body 1, and which prevents the engine oil from leaking to the outside. Note that, the flange 304 and the pump main body 1 may be integrally formed.

A plunger root portion 204 is provided with a tappet 310 which converts the rotational motion of a cam 309 attached to the camshaft of the internal combustion engine into a vertical motion at a lower end 308 of the plunger 108 and propagates it to the plunger 108. The plunger 108 is pressed against the tappet 310 by a spring 312 via a retainer 311. The plunger 108 thereby reciprocates vertically in accordance with the rotational motion of the cam 309.

A plunger seal 314 held at the lower end portion of the inner circumference of a seal holder 313 is installed in a state of slidably contacting with the outer circumference of the plunger 108 at the lower portion of a cylinder 315 in the drawing, and the fuel in an annular low-pressure fuel chamber 316 can be sealed when the plunger 108 slides to prevent the fuel from leaking to the outside.

In FIG. 2, the cylinder 201 guiding the reciprocating motion of the plunger 108 and having a bottomed cylindrical end portion (at the upper side in FIG. 2) to form the pressurizing chamber 114 inside is attached to the high-pressure fuel supply pump main body 101. Furthermore, in order to communicate with the flow-rate control valve 106 connecting to the pressurizing chamber 114 and with the discharge valve mechanism 115 for discharging the fuel from the pressurizing chamber 114 to the discharge passage, an annular groove 206 and a plurality of communicating holes connecting an annular groove 207 with the pressurizing chamber 114 are provided on the outer circumference side.

The cylinder 201 is fixed at its outer diameter by being press-fit and joined to the high-pressure fuel supply pump main body 101, and sealed on the press-fit cylindrical face so that the pressurized fuel does not leak to the low-pressure side from the gap between the high-pressure fuel supply pump main body 101 and the cylinder 201. The cylinder 201 has a small diameter portion 207 at the outer diameter on the pressurizing chamber 114 side. By pressurizing the fuel in the pressurizing chamber 114, the force acts on the cylinder 201 toward a low-pressure fuel chamber 220. However, by providing a small diameter portion 230 in the pump main body 101, the cylinder 201 is prevented from coming out to the low-pressure fuel chamber 208 side. The faces are brought in contact with each other in the axial direction, which functions as a double seal in addition to the seal of the high-pressure fuel supply pump main body 101 and the cylinder 201 on the contact cylindrical face.

A damper cover 208 is fixed to the head portion of the high-pressure fuel supply pump main body 101. A suction joint (not shown) is provided on the low-pressure fuel chamber side of the high-pressure fuel supply pump main body 101, and a low-pressure fuel suction port (not shown) is formed. The fuel having passed through the low-pressure fuel suction port passes through a filter (not shown) fixed inside the suction joint and reaches a suction port 209 of the flow-rate control valve 106 through the pressure pulsation reducing mechanism 202 and the low-pressure fuel flow passage 203.

The plunger 108 has a large diameter portion 210 and a small diameter portion 211, and the volume of the annular low-pressure fuel chamber 212 is increased or decreased by the reciprocating motion of the plunger 108. Since a fuel passage 320 (FIG. 3) communicates with the low-pressure fuel chamber 220, the increase or decrease of the volume causes the fuel to flow from the annular low-pressure fuel chamber 212 to the low-pressure fuel chamber 220 when the plunger 108 descends, and to flow from the low-pressure fuel chamber 220 to the annular low-pressure fuel chamber 212 when the plunger 108 rises. As a result, it is possible to reduce the flow rate of the fuel to the inside and outside of the pump in a suction process or a return process of the pump, and to reduce pulsation.

The low-pressure fuel chamber 220 is provided with the pressure pulsation reducing mechanism 202 which suppresses the spread of the pressure pulsation generated in the high-pressure fuel supply pump to a fuel pipe 130 (FIG. 1). When the fuel flowing into the pressurizing chamber 114 is returned to a suction passage 1203 (the suction port 209) through the suction valve 113 in the valve opening state for the capacity control, the fuel returned to the suction passage 203 (the suction port 209) generates pressure pulsation in the low-pressure fuel chamber 220. The pressure pulsation reducing mechanism 202 is formed by a metal damper in which two corrugated disk-shaped metal plates are bonded together at the outer circumferences thereof and an inert gas such as argon is injected into the inside, and pressure pulsation is absorbed and reduced by expansion and contraction of the metal damper. An installation bracket 221 fixes the metal damper to the high-pressure fuel supply pump main body 101. The discharge valve mechanism includes the discharge valve seat 115a, the discharge valve 115b which comes into contact with and separates from the discharge valve seat 115a, the discharge valve spring 115c which biases the discharge valve 115b toward the discharge valve seat 115a, and a discharge valve holder 115d housing the discharge valve 115b and the discharge valve seat 115a. The discharge valve seat 115a and the discharge valve holder 115d are joined by welding at a contact portion (not shown) to integrally form the discharge valve mechanism 115.

In FIG. 2, when there is no fuel pressure difference between the pressurizing chamber 114 and a fuel discharge port 12, the discharge valve 8b is pressed against the discharge valve seat 115a by the biasing force of the discharge valve spring 8c and is in a valve closing state. The discharge valve 115b is opened against the discharge valve spring 115c only when the fuel pressure in the pressurizing chamber 114 becomes larger than the fuel pressure at the fuel discharge port, and the fuel in the pressurizing chamber 114 is discharged to the common rail 121 through the fuel discharge port 12 at a high pressure. When the discharge valve 115b is opened, it contacts with a discharge valve stopper, and the stroke is restricted. Thus, the stroke of the discharge valve 115b is about determined by the discharge valve stopper. As a result, it is possible to prevent the fuel discharged at a high pressure to the fuel discharge port from flowing backward into the pressurizing chamber 114 again due to the delay of closing the discharge valve 115b caused by a too-large stroke, and to suppress the reduction in the efficiency of the high-pressure fuel supply pump.

Figure 4:
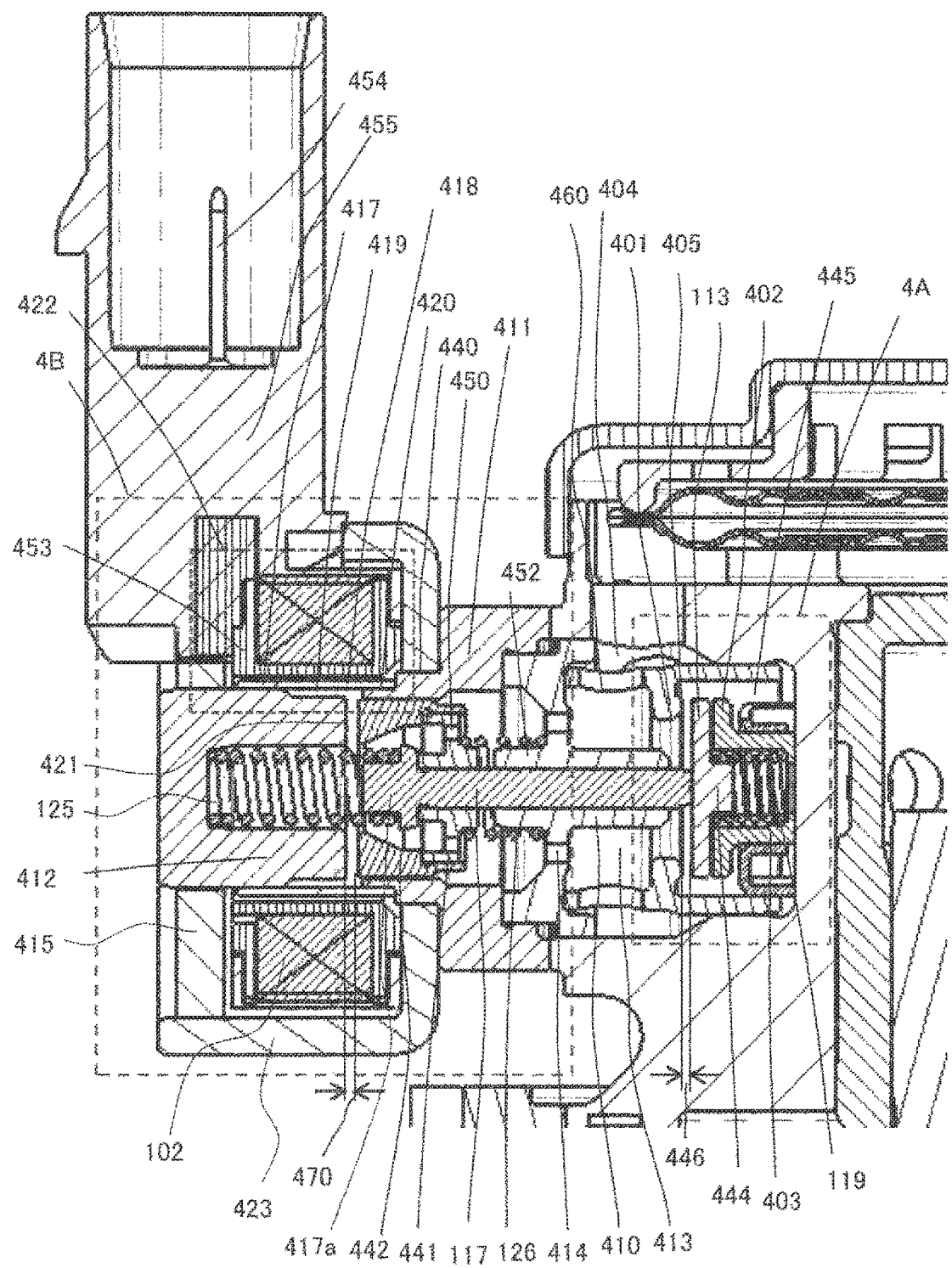
FIG. 4 is an enlarged cross-sectional view of a flow-rate control valve 106 of the high-pressure fuel supply pump main body 101 in the first embodiment.
Figure 5:
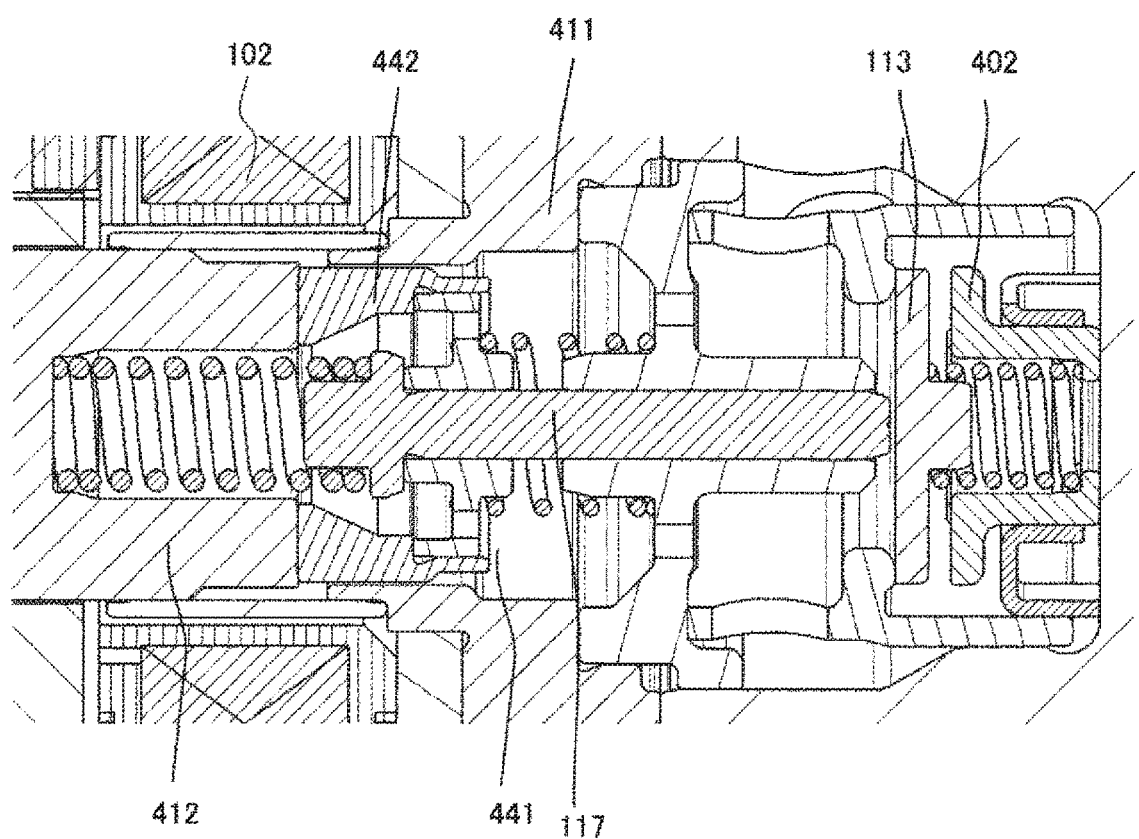
FIG. 5 is an enlarged cross-sectional view of the flow-rate control valve 106 in the first embodiment and shows that a suction valve 113 is closed and an anchor portion 118 is in contact with a fixed core 412 in a discharge process.
Figure 6:
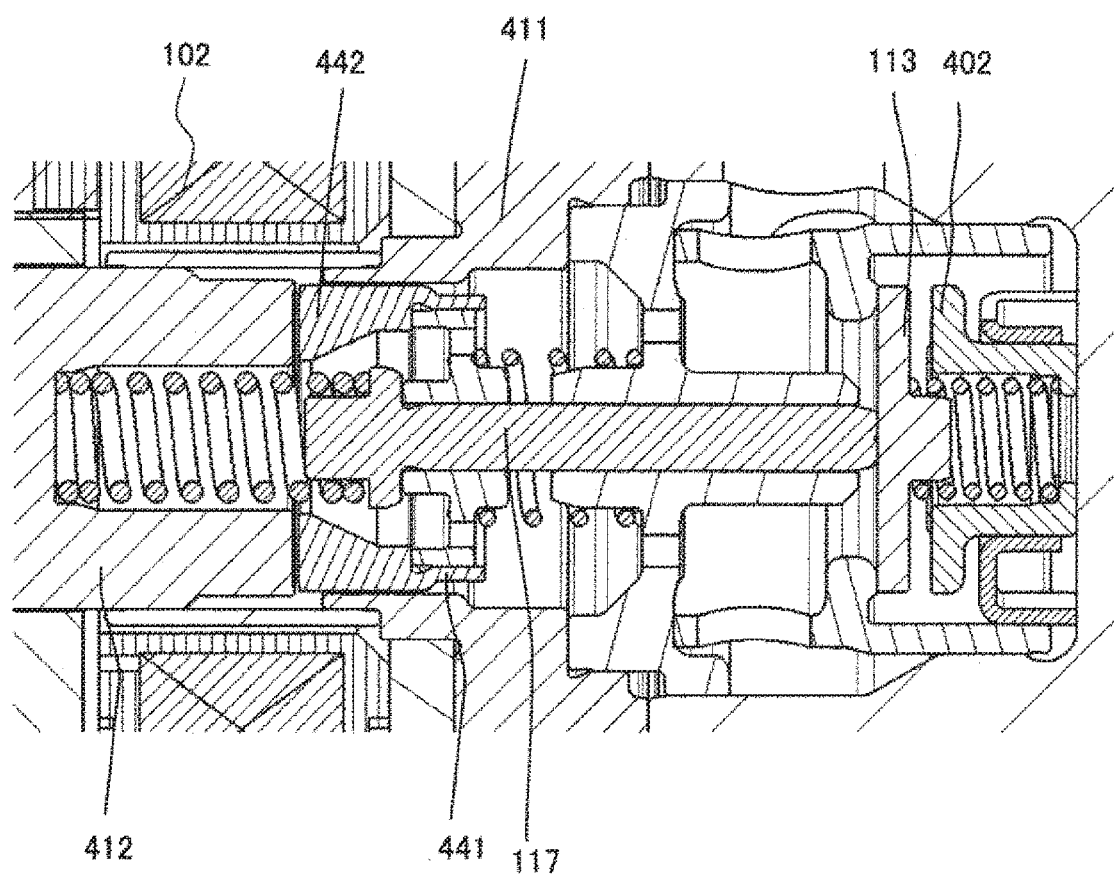
FIG. 6 is an enlarged cross-sectional view of the flow-rate control valve 106 in the first embodiment and shows that the suction valve 113 is closed and an anchor rod 117 is in contact with the suction valve 113 in the discharge process.

Next, the structure on the flow-rate control valve 106 side, which is a main portion of the present embodiment, will be described with reference to FIGS. 4, 5, and 6. FIG. 4 shows the state in a suction process in suction, return, and discharge processes in the pump operation, and FIGS. 5 and 6 show the state in the discharge process. First, the structure on the flow-rate control valve 106 side will be described with reference to FIG. 4. The structure on the flow-rate control valve 106 side is roughly divided into a suction valve portion 4A constituted mainly by the suction valve 113, and a solenoid mechanism portion 4B constituted mainly by the rod 117, the movable portion, and the solenoid 102. First, the suction valve portion A includes the suction valve 113, a suction valve seat 401, a suction valve stopper 402, the suction valve biasing spring 119, and a suction valve holder 403. The suction valve seat 401 is cylindrical and has a seat portion 405 on the inner circumference side in the axial direction and two or more suction passage portions 404 radially around the axis of the cylinder, and is held by being press-fit and joined to the high-pressure fuel supply pump main body 101 at the outer circumferential cylindrical face.

The suction valve holder 403 has radial claws in two or more directions, and the outer circumferential side of the claw is coaxially fitted and held on the inner circumferential side of the suction valve seat 401. A suction stopper 402 having a cylindrical shape and a flange shape at one end portion is held by being press-fit and joined to the inner circumferential cylindrical face of the suction valve holder 403.

The suction valve biasing spring 119 is arranged at a small diameter portion for coaxially stabilizing one end of the spring and on the inner circumferential side of the suction valve stopper 402. The suction valve 113 is fitted between a suction valve seat portion 405 and the suction valve stopper 402 so as to fit the suction valve biasing spring 119 on a valve guide portion 444. The suction valve biasing spring 119 is a compression coil spring and is installed so that a biasing force acts in a direction in which the suction valve 113 is pressed against the suction valve seat portion 405. The suction valve biasing spring 119 is not limited to a compression coil spring, and may be of any form as long as it can provide a biasing force, or may be a plate spring having a biasing force integrated with the suction valve 113.

By providing the suction valve portion A in this manner, in the suction process of the pump, the fuel having passed through the suction passage 404 and flowing into the flow-rate control valve passes between the suction valve 113 and the seat portion 405, passes between the outer circumferential side of the suction valve 113 and a fuel passage 445 provided at the outer diameter of the suction valve stopper 402, passes through the high-pressure fuel supply pump main body 101 and the passage of the cylinder, and flows into the pressurizing chamber. In the discharge process of the pump, the suction valve 113 comes into contact with the suction valve seat portion 405 and thereby seals the fuel, and which functions as a check valve preventing the fuel from flowing backward to the inlet side.

The movement amount 446 of the suction valve 113 in the axial direction is finitely regulated by the suction valve stopper 402. This is because that performance of the pump is deteriorated by the increase in the back-flow amount due to the response delay when the suction valve 113 is closed if the movement amount is too large. The regulation of the movement amount can be defined by the axial dimensions and the press-fitting positions of the suction valve seat 401, the suction valve 113, and the suction valve stopper 402.

The suction valve stopper 402 is provided with an annular protrusion to reduce the contact area with the suction valve stopper 402 while the suction valve 113 is being opened. This is because that the suction valve 113 easily separates from the suction valve stopper 402 when the valve opening state is shifted to the valve closing state, that is, the valve closing responsiveness is to be improved. If the annular projection is not provided, that is, when the contact area is large, the pressure between the suction valve 113 and the suction valve stopper 402 decreases when the suction valve 113 separates from the suction valve stopper 402, the squeezing force acts in a direction in which the movement of the suction valve 113 is hindered, and the suction valve 113 is difficult to separate from the suction valve stopper 402.

Since the suction valve 113, the suction valve seat 401, and the suction valve stopper 402 repeatedly collide with each other during their operations, it is preferable to use a material which is martensitic stainless steel having high strength, high hardness and excellent corrosion resistance, and subjected to heat treatment. It is preferable to use an austenitic stainless steel material for the suction valve spring 119 and the suction valve holder 403 in consideration of corrosion resistance.

Next, the solenoid mechanism portion 4B will be described. The solenoid mechanism portion B includes the rod 117 as a movable portion, a guide portion 410 as a movable portion and a fixed portion, an outer core 411, a fixed core 412, the rod biasing spring 125, the anchor portion biasing spring 126, a cover portion 415, a yoke 423, and the solenoid 102.

The rod 117 which is a movable portion and the anchor 118 are formed separately. The rod 117 is held slidably in the axial direction on the inner circumferential side of the guide portion 410, and the inner circumferential side of the anchor sliding portion 441 of the movable portion is held slidably on the outer circumferential side of the rod 117. That is, both of the rod 117 and the anchor portion 118 are formed to be slidable in the axial direction within a range geometrically regulated. The anchor sliding portion 441 is formed to contact with a flange portion 417a of the rod 117 at the end face on the fixed core 412 side.

In order to freely smoothly move in the fuel in the axial direction, the anchor portion 118 has one or more through holes 450 penetrating through the anchor sliding portion 441 in the axial direction of the component, and the restriction of movement by the pressure difference across the anchor portion 118 is thereby excluded as much as possible. The through hole 450 may be provided at the center of the rod 117 so as to connect the space on the fixed core 412 side of the anchor portion 118 with the space 413 on the upstream side of the suction valve seat 401 by providing a lateral groove fuel passage on the suction valve 113 side rather than the guide portion 410 so as to be substantially parallel to the suction passage portion 404. As a result, the space on the fixed core 412 side of the anchor portion 118 can communicate without providing the fuel passage 414 of the guide portion 410, and the machining cost of the guide portion 410 can be suppressed.

The guide portion 410 is arranged by being inserted into the inner circumferential side of the hole into which the suction valve 113 of the high-pressure fuel supply pump main body 101 is inserted in the radial direction, abutting against one end portion of the suction valve seat 405 in the axial direction, and being sandwiched between the outer core 411 welded and fixed to the high-pressure fuel supply pump main body 101 and the high-pressure fuel supply pump main body 101. Similarly to the anchor portion 118, the fuel passage 414 penetrating in the axial direction is provided also at the guide portion 410 so that the pressure in the fuel chamber on the anchor portion 118 side does not hinder the movement of the anchor portion 118 in order for the anchor portion 118 to freely smoothly move.

The outer core 411 has a thin-walled cylindrical shape on the side opposite to the portion to be welded to the high-pressure fuel supply pump main body 101, and the fixed core 412 is inserted into the inner circumferential side and fixed by being welded and joined. A rod biasing spring 40 is arranged on the inner circumferential side of the fixed core 412 using the small diameter portion as a guide so that the rod 117 comes into contact with the suction valve 113, and applies a biasing force in the direction in which the suction valve 113 separates from the suction valve seat 401, that is, in the valve opening direction of the suction valve 113.

The anchor portion biasing spring 126 is arranged so as to apply a biasing force to the anchor portion 118 toward a rod flange portion 117a while maintaining the same axis by inserting one end into a central bearing portion 452 having a cylindrical diameter provided on the center side of the guide portion 410. The movement amount 470 of the anchor portion 118 is set to be larger than the movement amount 446 of the suction valve 113. By bringing the suction valve 113 into contact with the suction valve seat 401 before the anchor portion 118 comes into contact with the fixed core 412 when the suction valve 113 is closed from the valve opening state, the suction valve 113 is reliably closed and the responsiveness when the suction valve 113 is closed can be secured. As a result, the discharge flow rate can be secured. The excluded volume associated with the movement of the anchor portion 118 at the time of the valve closing flows between the anchor portion 118 and the fixed core 812, whereby the pressure between the anchor portion 118 and the fixed core 812 increases. As the pressure increases, a fluid force, that is, a squeezing force acts on the anchor portion 118 and pushes it in the direction opposite to the valve closing direction. Since the squeezing force is generally proportional to the cube of the gap between the anchor portion 118 and the fixed core 812, the influence is larger as the gap is smaller. By increasing the movement amount of the anchor portion 118 more than the movement amount 447 of the suction valve 113, the suction valve 113 is closed before the squeezing force acting on the anchor portion increases, and the decrease in the discharge flow rate caused by the deterioration of responsiveness of the suction valve 113 can be suppressed.

Since the rod 117 and the guide portion 410 slide on each other and the rod 117 repeatedly collides with the suction valve 113, a martensitic stainless steel subjected to heat treatment is used in consideration of hardness and corrosion resistance. It is preferable that ferrite magnetic stainless steel is used for the anchor portion 118 and the fixed core 412 to form a magnetic circuit, and that austenitic stainless steel is used for the rod biasing spring 125 and the anchor portion biasing spring 126 in consideration of corrosion resistance.

According to the above structure, three springs are arranged in an organic manner in the suction valve portion A and the solenoid mechanism portion B. The suction valve biasing spring 119 arranged in the suction valve portion A, and the rod biasing spring 125 and the anchor portion biasing spring 126 arranged in the solenoid mechanism portion B correspond to the three springs. In this embodiment, all the springs are coil springs, but any type can be used as long as it can obtain the biasing force.

The relation between these three spring forces is constituted by the following expression.

[Expression 1]

$$\text{force of the rod biasing spring 125} > \text{force of the anchor portion biasing spring 126} + \text{force of the suction valve biasing spring 119} + \text{force for the suction valve 113 to close due to fluid} \quad (1)$$

Due to the relation of expression (1), when the solenoid 102 is not energized, each spring force acts on the rod 117 as a force f1 in a direction in which the suction valve 113 is separated from the suction valve seat portion 405, that is, in a direction in which the valve is opened. From expression (1), the force f1 in the direction in which the valve is opened is expressed by the following expression (2).

[Expression 2]

$$f1 = \text{force of the rod biasing spring 125} - (\text{force of the anchor portion biasing spring 126} + \text{force of the suction valve biasing spring 119} + \text{force for the suction valve to close due to fluid}) \quad (2)$$

Next, the structure of the solenoid portion around the solenoid 102 of the solenoid mechanism portion 4B will be described. The solenoid portion includes the cover portion 415, the yoke 423, the solenoid 102, a bobbin 453, a terminal 454, and a connector 455. The solenoid 102 in which a copper wire is wound a plurality of times on the bobbin 453 is arranged so as to be surrounded by the cover portion 415 and the yoke 423, and is molded and fixed integrally with the connector which is a resin member. One ends of the two terminals 454 are connected to both ends of the copper wire of the solenoid 102 so as to be energizable. Similarly, the terminal 454 is integrally molded with the connector 455, and the other end is connectable to the engine control unit side.

A seal ring 418 is provided on the radial solenoid 102 side in the diameter direction of the outer diameter of the fixed core 412. The seal ring 418 is fixed by being press-fitted and joined to the outer diameter portion 417 of the fixed core 412 and the outer diameter portion 420 of the outer core 411, and seals the fuel by welding the vicinity of the press-fitting fixed portion. The seal ring 418 is provided on the outer diameter side opposed to a suction face 421 of the fixed core 412 in the radial direction. A small diameter portion 440 of the yoke 423 is press-fitted and fixed to the outer core 411. At that time, the inner diameter side of the cover portion 415 comes into contact with a fixed core 39 or comes close to it with a slight clearance.

Both of the cover portion 415 and the yoke 423 are made of a magnetic stainless steel material to form a magnetic circuit and in consideration of corrosion resistance, and the bobbin 453 and the connector 454 are made of a high strength heat resistant resin in consideration of a strength property and heat resistance property. The solenoid 102 is made of copper, and the terminal 454 is made of metal plated brass.

By forming the solenoid mechanism portion B in the above manner, as shown in the broken line 422 in FIG. 4, the magnetic circuit is formed by the anchor portion 118, the fixed core 412, the cover portion 415, the yoke 423, and the outer core 411, and when current is supplied to the solenoid 102, a magnetic attraction force is generated between the fixed core 412 and the anchor portion 118, whereby a force pulling the anchor portion 118 toward the fixed core 412 is generated. By using austenitic stainless steel for the seal ring 418, the magnetic flux easily passes between the fixed core 412 and the anchor portion 118, and the magnetic attraction force can be improved. When the seal ring 418 is formed integrally with the outer core 411, the magnetic flux flowing on the outer core 411 side can be reduced by making the portion positioned at the outer diameter in the radial direction of the suction face 421 thinner as much as possible. As a result, the magnetic flux passing between the fixed core 412 and the anchor portion 118 increases, and the magnetic attraction force can be improved.

When the magnetic attraction force exceeds the force f1 in the direction in which the valve in the above expression (2) is opened, the anchor portion 118, which is the movable portion, is attracted to the fixed core together with the rod 117, and the anchor portion continues to move until the anchor portion 118 comes into contact with the fixed core 412.

According to the above structure of the high-pressure fuel supply pump of the present invention, in the suction, return, and discharge processes in the pump operation, the pump operates as follows.

First, the suction process will be described. In the suction process, the plunger 108 moves toward the cam 309 (the plunger 108 descends) by the rotation of the cam 309 in FIG. 3. That is, the position of the plunger 108 moves from the top dead center to the bottom dead center. In the suction process state, referring to, for example, FIGS. 1, 2 and 3, the volume of the pressurizing chamber 114 increases and the fuel pressure in the pressurizing chamber 114 decreases. In this process, when the fuel pressure in the pressurizing chamber 114 becomes lower than the pressure in the suction passage 105, the fuel passes through the suction valve 113 in the opening state, passes through a communication hole 205 provided in the high-pressure fuel supply pump main body 101 and a cylinder outer circumferential passage 206, and flows into the pressurizing chamber 114.

The positional relation of the parts on the flow-rate control valve 106 side in the suction process will be described with reference to FIG. 4. In this state, the solenoid 102 is not being energized and no magnetic attraction force is acting. Accordingly, the suction valve 113 is pressed against the rod 117 by the biasing force of the rod biasing spring 125, and is in contact with the suction valve stopper 402 and opened.

Next, the return process will be described. In the return process, the plunger 108 moves in the rising direction by the rotation of the cam 309 in FIG. 3. That is, the position of the plunger 108 starts to move from the bottom dead center to the top dead center. At this time, the volume of the pressurizing chamber 114 decreases associated with the compression motion after the suction in the plunger 108. However, in this state, the fuel sucked into the pressurizing chamber 114 once is returned to suction passage 404 through the suction valve 113 in the valve opening state again, and the pressure in the pressurizing chamber 114 does not increase. This process is referred to as the return process.

In this state, when a control signal from the engine control unit 123 is applied to the flow-rate control valve 106, the return process is shifted to the discharge process. When a control signal is applied to the flow-rate control valve 106, magnetic flux is generated in the magnetic circuit, and a magnetic attraction force is generated in the anchor portion 118. FIG. 5 shows the positional relation of the parts on the flow-rate control valve 106 side when the magnetic attraction force is acting, the description will be made with reference to FIG. 5. In this state, when current is supplied to the solenoid 102, the magnetic flux passes between the fixed core 412 and the anchor portion 118, and the magnetic attraction force is generated in the anchor portion 118, whereby the magnetic attraction which attracts the anchor portion 118 toward the fixed core 412 is generated. When the anchor portion 118 is attracted to the fixed core 412 which is the fixed portion, the rod 117 separates from the suction valve 113 by the locking mechanism of the anchor portion 118 and the rod flange portion 417a. At this time, the suction valve 113 is closed by the biasing force of the suction valve biasing spring 119 and the fluid force caused by the fuel flowing into the suction passage 404. After the valve is closed, the fuel pressure in the pressurizing chamber 114 rises together with the rising motion of the plunger 108. When the fuel pressure in the pressurizing chamber 114 exceeds the pressure of the fuel discharge port of the discharge valve mechanism 115, the fuel is discharged at a high pressure through the discharge valve mechanism 115, and is supplied to the common rail 121. This process is referred to as the discharge process.

The compression process (rising process from the lower starting point to the upper starting point) of the plunger 108 includes the return process and the discharge process. By controlling the energization timing of the flow-rate control valve 106 to the solenoid 102, the amount of high-pressure fuel to be discharged can be controlled. If the timing to energize the solenoid 102 is advanced, the ratio of the return process in the compression process is small, and the ratio of the discharge process is large. That is, the amount of the fuel returned to the suction passage 404 is small, and the amount of the fuel discharged at a high pressure is increased. On the other hand, if the energization timing is delayed, the ratio of the return process in the compression process is large, and the ratio of the discharge process is small. That is, the amount of the fuel returned to the suction passage 404 is large, and the fuel discharged at a high pressure is reduced. The energization timing to the solenoid 102 is controlled by a command from the engine control unit 123, whereby the amount of fuel discharged at a high pressure can be controlled to an amount required by the internal combustion engine.

FIG. 6 shows the positional relation of the parts on the flow-rate control valve 106 side in the discharge process. This shows a state of a non-energized state in which the solenoid 102 is not energized when the suction valve 113 is being closed (in a closing state) after the pressure in the pump chamber has sufficiently increased. This state prepares, for the next cycle process, to effectively generate the next magnetic attraction force and to provide the effect. This structure has a feature in performing the preparation.

Figure 7:
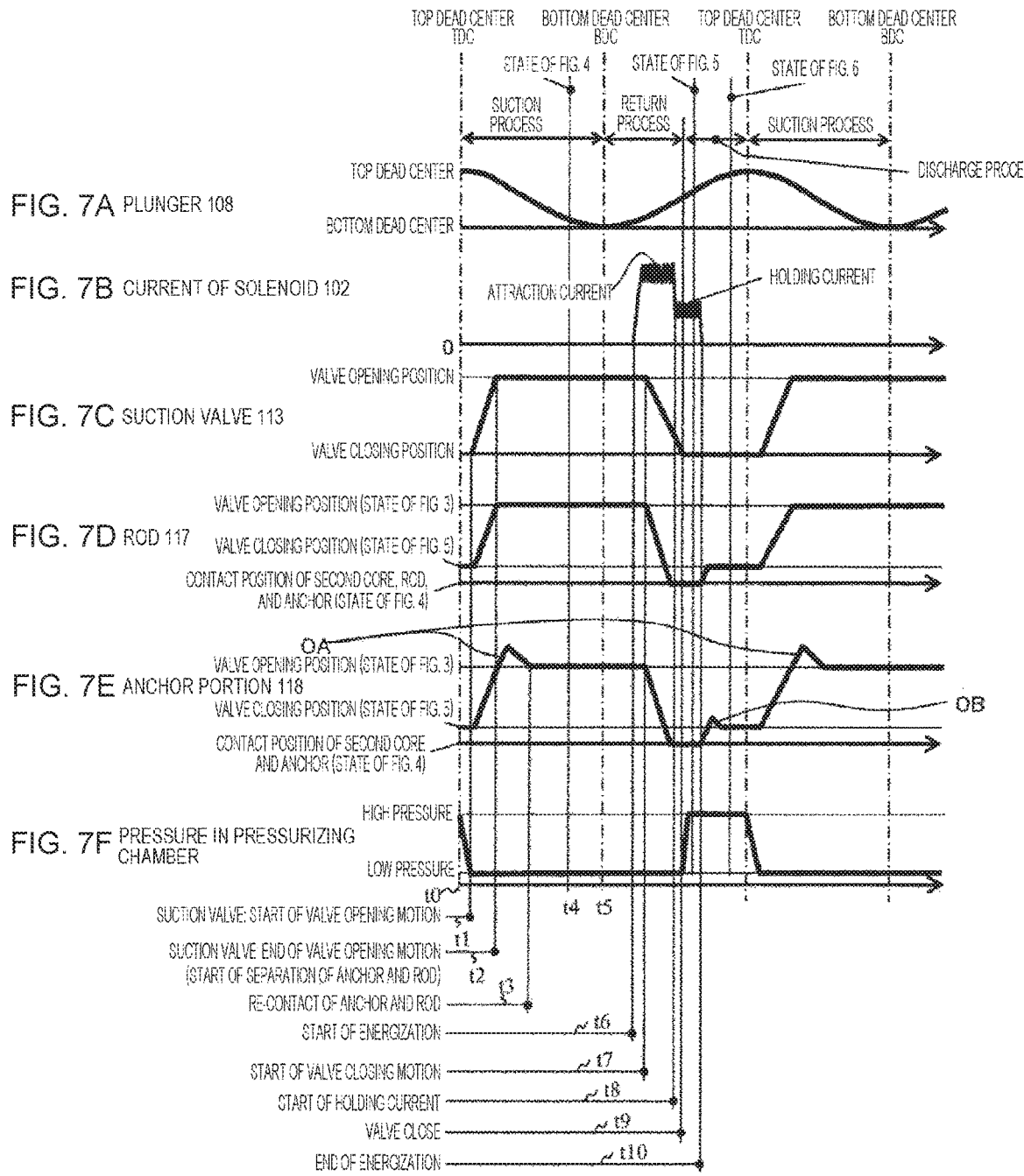
FIG. 7 is a diagram

The timing chart of FIG. 7 shows in the order from the top: a) position of the plunger 108; b) current of the solenoid 102; c) position of the suction valve 113; d) position of the anchor rod 117; e) position of the anchor portion 118; and f) pressure in the pressurizing chamber 114. The abscissa shows each time t in one cycle period from the suction process, through the return process and the discharge process and to the suction process in time series.

According to a) the position of the plunger 108 in FIG. 7, the suction process is a period in which the position of the plunger 108 reaches the bottom dead center from the top dead center, and the return process and the discharge process are the periods in which the position of the plunger 108 reaches the top dead center from the bottom dead center. According to b) the coil current, an attraction current is applied the solenoid 102 during the return process, and the process is shifted to the discharge process while a holding current is being applied.

Furthermore, C) the position of the suction valve 113, d) the position of the rod 117, and e) the position of the anchor portion 118 are changed according to the generation of the magnetic attraction force by the current supply to b) the solenoid 102, and are returned to the original positions at the beginning of the suction process. In response to these position changes, f) the pressure in the pressurizing chamber becomes high during the discharge process.

The relation between the operation of each part in each process and each physical quantity at that time will be described below. First, in the suction process, when the plunger 108 starts to descend from the top dead center at the time t0, f) the pressure in the pressurizing chamber abruptly decreases from the high-pressure state of, for example, the level of 30 MPa. According to the decrease in pressure, the rod 117, the anchor portion 118, and the suction valve 113 start to move in the valve opening direction of the suction valve 113 at the time t1 due to the force f1 in the direction in which the valve is opened in the above expression (2), and the suction valve 113 is fully opened at the time t2, and the rod 117 and the anchor portion 118 are in the valve opening position state in FIG. 3. As a result, the suction valve 113 is opened, and the fuel flowing into the inner diameter side of the suction valve seat 405 from a passage 460 of the suction valve seat 401 starts to be sucked into the pressurizing chamber 114.

At the time of movement at the beginning of the suction process, the suction valve 113 collides with the suction valve stopper 402, and the suction valve 113 stops at that position. Similarly, the rod 117 also stops at the position where the tip contacts the suction valve 113 (the valve opening position of the plunger rod in FIG. 7).

In contrast, the anchor portion 118 moves initially in the valve opening direction of the suction valve 113 at the same speed as the rod 117, but is continuing to move by the inertial force after the time t2 when the rod 117 comes into contact with the suction valve 113 and stops. The portion indicated by OA in FIG. 7 is the region of this overshoot. At this time, the anchor portion biasing spring 126 overcomes the inertial force, the anchor portion 118 moves again in the direction approaching the fixed core 412, and stops at the position where the anchor portion 118 comes into contact with the rod flange portion 417*a* in a state of being pressed (anchor portion valve opening position in FIG. 7). The time t3 indicates the stop time of the anchor portion 118 due to the re-contact of the rod 117 and the anchor portion 118. FIG. 4 shows the respective positions of the anchor portion 118, the rod 117, and the suction valve 113 at the time t4 in the stable state after the stop time t3.

In the above description and FIG. 7, it has been described that the rod 117 completely separates from the anchor portion 118 in the portion indicated by OA, but the rod 117 and the anchor portion 118 may remain in contact with each other. In other words, the load acting on the contact portion of the rod flange portion 417*a* and the anchor portion 118 decreases after the anchor rod 117 stops moving, and when it becomes 0, the anchor portion 118 starts to separate from the anchor rod 117. However, the force of the anchor portion biasing spring 126 may be set not to be 0 but to leave a slight load. When the suction valve 113 collides with the suction valve stopper 402, a problem of abnormal noise, which is an important characteristic as a product, occurs. Although the magnitude of the abnormal noise depends on the magnitude of energy at the time of collision, the energy colliding with a suction valve stopper 32 is generated only by the mass of the suction valve 113 and the mass of the anchor rod 117 since the rod 117 and the anchor 118 are formed separately in the present invention. That is, since the mass of the anchor portion 118 does not contribute to the collision energy, by forming the rod 117 and the anchor portion 118 separately, the problem of abnormal noise can be reduced.

If the anchor portion biasing spring 126 is not provided although the rod 117 and the anchor portion 118 are formed separately, the anchor portion 118 continues to move in the valve opening direction of the suction valve 113 due to the inertial force, and collides with the end face on the fixed core 412 side of a guide portion 117, and which can cause a problem that abnormal noise occurs at a portion different from the collision portion. In addition to the problem of abnormal noise, the collision causes abrasion, deformation, and the like of the sliding portion 441 and a guide portion 442 which are components of the anchor portion 118. Furthermore, the abrasion generates metal foreign substances, and the foreign substances are caught in the sliding portion or the seat portion, and deform and impairs the bearing function, whereby the function of the suction valve solenoid mechanism can be impaired. However, by forming the sliding portion 441 which requires strength to collide with and slide on the movable portion 442 constituting the magnetic circuit separately, impairing the function of the suction valve solenoid mechanism can be suppressed. It is preferable that ferrite stainless steel having a good magnetic property is used for the movable portion 442, and that austenitic stainless steel having high hardness is used for the sliding portion 441. For example, it is preferable to use SUS 420 hardness of which can be secured by heat treatment of quenching for the sliding portion 441.

If the anchor portion biasing spring 126 is not provided, in order for the anchor portion 118 to continue to move in the valve opening direction by the inertial force, the distance from the face opposed to the fixed core 412 of the anchor portion 118 to the suction face 421 of the fixed core 412 is to be large (the OA portion in FIG. 7). As a result, when current is supplied to the solenoid 102 to shift the return process to the discharge process which is a post-process in the operation time, the magnetic resistance between the fixed core 421 and the anchor portion 118 increases, and the required magnetic attraction force cannot be obtained. When the required magnetic attraction force cannot be obtained, the maximum flow rate of the fuel discharged from the high-pressure fuel supply pump can decrease.

Thus, the anchor portion biasing spring 126 has an important function for preventing the decrease in the flow rate.

After the suction valve 113 is opened, the plunger 108 further descends to reach the bottom dead center (time t5). During this time, the fuel continues to flow into the pressurizing chamber 114, and this process is the suction process. The plunger 108 descending to the bottom dead center is in the rising process and the process is shifted to the return process.

At this time, the suction valve 113 remains stopped in the valve opening state by the force f1 in the direction in which the valve is opened, and the direction of the fluid passing through the suction valve 113 is in the exact opposite direction. That is, whereas the fuel has flowed into the pressurizing chamber 114 from the passage of the suction valve seat 405 in the suction process, the fuel returns from the pressurizing chamber 114 toward the passage of the suction valve seat 405 at the timing of the rising process. This process is the return process.

In this return process, when the engine rotates at a high speed, that is, when the rising speed of the plunger 108 is high, the valve closing force of the suction valve 113 due to the returning fluid increases, and the force f1 in the direction in which the valve is opened decreases. Under this condition, if each spring force is wrongly set and when the force f1 in the direction in which the valve is opened becomes a negative value, the suction valve 113 is unintentionally closed. Since a larger flow rate than the desired discharge flow rate is discharged, the pressure in the fuel pipe rises above the desired pressure, and which adversely affects the combustion control of the engine. For this reason, it is necessary to set each spring force so that the force f1 in the direction in which the valve is opened maintains a positive value under the condition where the rising speed of the plunger 108 is the highest.

Furthermore, from the viewpoint of reducing the environmental burden, ethanol mixed gasoline represented by biofuel has spread. Since ethanol mixed gasoline has lower energy density than gasoline which does not contain ethanol, the amount of fuel required to be injected by an injector 122 increases to obtain the same output. The valve closing force due to the fluid acting on the suction valve 113 increases as the flow speed of the fuel flowing through the suction valve seat 405 becomes high, and the valve closing force increases as the fuel injected by the injector 122 increases.

At the time t6 in the middle of the return process, current is supplied to the solenoid 102 to create a transition state from the return process to the discharge process. In FIG. 7, the time t7 is the closing motion start time of the suction valve 113, the time t8 is the hold current start time, the time t9 is the valve closing time of the suction valve 113, and the time t10 is the energization end time of the solenoid 102.

In this case, if current is supplied to the solenoid 102 at a time earlier than the desired discharge time in consideration of the delay in generation of the magnetic attraction force and the valve closing delay of the suction valve 113, the magnetic flux passes between the anchor portion 118 and the fixed core 412, and the magnetic attraction force acts on the anchor portion 118. The current having the magnitude for overcoming the force f1 in the direction in which the valve is opened is required to be supplied. At the time t7 when this magnetic attraction force overcomes the force f1 in the direction in which the valve is opened, the anchor portion 118 starts moving toward the fixed core 412. The anchor portion 118 moves in the valve closing direction, and the rod 117 in contact with it at the flange portion 417a in the axial direction similarly moves in the valve closing direction. Then, the suction valve 113 starts to be closed (time t9) by the force of the suction valve biasing spring 126 and by the decrease in the fluid force, mainly in the static pressure due to the flow speed passing through the seat portion from the pressurizing chamber side.

When current is supplied to the solenoid 102 and when the distance between the anchor portion 118 and the fixed core 412 are larger than a predetermined distance, that is, when the anchor portion 118 exceeds the "valve opening position" in FIG. 7 and the state of OA continues, the magnetic attraction force acting on the anchor portion 118 is small, and cannot overcome the force f1 in the direction in which the valve is opened, whereby a problem that it takes time for the anchor portion 36 to move toward the fixed core 39 or the anchor portion 36 cannot move within a predetermined time occurs.

In order not to cause this problem, the anchor portion biasing spring 126 is provided in the present invention. When the anchor portion 118 cannot move to the fixed core 412 at a desired timing, the discharge process cannot be started because the suction valve 113 is kept opened at a desired discharge timing. That is, since a required discharge amount cannot be obtained, the desired engine combustion cannot be performed. Thus, the anchor portion biasing spring 126 has an important function to prevent the abnormal noise problem that can occur in the suction process, and to prevent the problem that the discharge process cannot be started.

In FIG. 7, c) the suction valve 113 starting to move collides with the seat portion 401 and stops, and is thereby in the valve closing state. When the valve is closed, the in-cylinder pressure rapidly increases, and the suction valve 113 is firmly pressed by the in-cylinder pressure in the valve closing direction with a force much larger than the force f1 in the direction in which the valve is opened, whereby the valve closing state is maintained.

After the suction valve 113 is closed, the anchor rod 117 separates from the suction valve 113, and e) the anchor portion 118 thereby moves toward the fixed core 412, collides with the fixed core 412, and stops. A rod 35 continues to move due to the inertial force after the anchor portion 36 stops, but is pushed back when the rod biasing spring 126 overcomes the inertial force, and returned to the position where the flange portion 417a comes into contact with the anchor portion 118.

When the anchor portion 118 collides with the fixed core 412, a problem of abnormal noise, which is an important characteristic as a product, occurs. During the valve closing operation, since the magnetic attraction force acting in the valve closing direction is larger than that during the valve opening operation, the collision speed of the anchor portion 118 and the fixed core 412 can be higher than the collision speed of the suction valve 113 and the suction valve stopper 402 during the valve opening operation. Thus, this abnormal sound is larger than the abnormal noise caused when the suction valve 113 collides with the suction valve stopper 402 as described above, and can be a larger problem. The magnitude of the abnormal noise depends on the magnitude of the energy at the time of collision, but the anchor rod 117 and the anchor portion 118 are formed separately, and only the mass of the anchor portion 118 contributes to the energy colliding with the fixed core 412. That is, since the mass of the rod 117 does not contribute to the collision energy, by forming the rod 117 and the anchor portion 118 separately, the problem of abnormal noise is reduced.

After the time t8 when the anchor portion 118 is brought into contact with the fixed core 412 once, since the magnetic resistance between the anchor portion 118 and the fixed core 412 is small due to the contact, a sufficient magnetic attraction force is generated, and a small current value (holding current) is only required to maintain the contact.

Here, the problem of erosion caused by fluid which can occur in the solenoid mechanism portion 4B will be described. When current is supplied to the solenoid 102 and the anchor portion 118 is attracted to the fixed core 412, the space volume between the two objects shrinks rapidly, and the fluid in that space loses its position, is pushed toward the outer circumferential side of the anchor portion 118 at a high flowing speed, and collides with the seal ring 418, whereby erosion can be caused by the energy. Although the pushed fluid passes through the outer circumference of the anchor portion 118 and flows toward the guide portion, the flow speed becomes high since the passage on the outer circumferential side of the anchor portion is narrow. That is, cavitation occurs due to a rapid decrease in the static pressure, and cavitation erosion can occur at the seal ring 418. According to the structure of the high-pressure fuel pump main body 101 in FIG. 4 in the first embodiment, by using the seal ring 418, a thin wall portion is not required to be formed in the outer core 411 in order to propose leakage magnetic flux passing through a portion other than the suction face 421, and the cavitation can be suppressed.

In order to avoid these problems, one or more through holes 450 (FIG. 4) in the axial direction are provided on the center side of the sliding portion 441 constituting the anchor portion 118. By providing the through hole 450, when the anchor portion 118 is attracted toward the fixed core 412, the flow rate of the fluid in the space passing through the narrow passage on the outer circumferential side of the movable portion 442 is reduced. With this structure, the problem of erosion can be solved.

If the anchor portion 36 and the rod 35 are integrally formed, a phenomenon that raises a further concern of the above problem occurs. When the engine rotates at a high speed, that is, when the rising speed of the plunger 108 is high, the force closing the suction valve 113 by the fluid having a very high speed is added to the force that the anchor portion 118 moves to the fixed core 412 caused when current is supplied to the solenoid 102, and the force is increased. Thus, the anchor rod 117 and the anchor portion 118 rapidly come close to the fixed core 412, and the speed at which the fluid in that space is pushed out further increases, whereby the problem of erosion becomes larger. If the capacity of the through hole 450 of the anchor portion 118 is insufficient, the problem of erosion cannot be solved. If the through hole 450 is provided in the end face on the fixed core 412 side of the movable portion 442, the attractive area is reduced, and the magnetic attraction force is lowered. By forming the movable portion 442 and the sliding portion 441 separately, the through hole 450 can be provided at a position in the downstream of the movable portion 442 which is not the main passage of the magnetic circuit, and both of the magnetic attraction force and the fuel passage can be secured. The position of the through hole 450 in the radial direction is preferably on the outer diameter side rather than the inner diameter of the fixed core 412 or the inner diameter of the end face on the fixed core 412 side of the movable portion 442. With such a structure, it is possible to geometrically secure a large cross-sectional area of the through hole 450, and to reduce the flow rate flowing around the outer circumference of the movable portion 442. As a result, cavitation erosion can be more suppressed.

If the anchor portion 118 and the rod 117 are formed separately, the rod 117 is only pushed out toward the fixed core 412 when the force closing the suction valve 113 is applied to the rod 117, and the anchor portion 118 is left behind but moves toward the fixed core 412 only by the normal magnetic attraction force. That is, a rapid reduction in space does not occur, and the problem of erosion can be prevented.

Disadvantages of forming the anchor portion 118 and the rod 117 separately are, as described above, that a desired magnetic attraction force cannot be obtained, the abnormal noise, and the function deterioration. However, by installing the anchor portion biasing spring 126 in this structure, it is possible to eliminate these disadvantages.

Next, the discharge process will be described. In FIG. 7, immediately after the return process in which the plunger 108 shifts from the bottom dead center to the rising process, current is supplied to the solenoid 102 at a desired timing, and the suction valve 113 is closed, the pressure in the pressurizing chamber rapidly increases, and which is in the discharge process.

After the discharge process, it is desirable to reduce the electric power to be supplied to the solenoid 102 from the viewpoint of power saving, and the current to be supplied to the solenoid 102 is disconnected. As a result, no magnetic attraction force acts on the anchor portion 118, and the anchor portion 118 and the rod 117 separate from the fixed core 412 due to the resultant force of the rod biasing spring 125 and the anchor portion biasing spring 126. However, since the pressure in the pressurizing chamber is high and the suction valve 113 is in the valve closing position due to a large fluid force, the rod 117 stops at the position where it collides with the suction valve 113 in the valve closing state. That is, the movement amount of the rod 117 at this time is a value obtained by subtracting 446 from 470 in FIG. 4.

After the supply of the current to the solenoid 102 is stopped, the rod 117 and the anchor portion 118 move simultaneously at the timing when the magnetic attraction force acting on the anchor portion 118 becomes lower than the force in the valve opening direction acting on the anchor portion 118 and the rod 117. However, the anchor portion 118 continues to move toward the suction valve 113 (the state of OB in FIG. 7) due to the inertial force after the rod 117 stops in a state in which the tip of the rod 117 is in contact with the closing suction valve 113. However, since the anchor portion biasing spring 126 overcomes the inertial force and applies the biasing force to the anchor portion 118 toward the fixed core 412, the anchor portion 118 can stop in contact with the flange portion 417a of the rod 117 (state of FIG. 6).

If the anchor portion biasing spring 126 is not provided, the anchor portion 118 moves toward the suction valve 113 without stopping similarly to the above-described suction process, and the problems of abnormal noise caused by the collision with the guide portion 410 and function failure can occur. However, since the anchor portion biasing spring 41 is provided, the above problems can be prevented.

In this manner, the discharge process of discharging the fuel is performed, and the suction valve 113, the rod 117, and the anchor portion 118 are in the state of FIG. 6 immediately before the next suction process. When the plunger 108 reaches the top dead center, the discharge process is completed, and the suction process is started again.

Thus, it is possible to provide a high-pressure fuel supply pump suitable for pressurizing the required amount of the fuel guided to the low-pressure fuel suction port (not shown) to a high pressure by the reciprocating motion of the plunger 108 in the pressurizing chamber 114 of the high-pressure fuel supply pump main body 101 as the pump main body, and for pressure-feeding the fuel from the fuel discharge port (not shown) to the common rail 121.

Since the suction valve 113 is required to be closed quickly, it is preferable to set the spring force of the suction valve spring 119 as large as possible and to set the spring force of the anchor portion biasing spring 41 to be small. As a result, it is possible to prevent deterioration of the flow efficiency due to closing delay of the suction valve 113.

As described above, when the anchor portion 118 and the rod 117 are formed separately and the anchor portion biasing spring 126 is provided, the anchor portion 118 overshoots like OA and OB shown in FIG. 7. Thus, the anchor portion 118 and the rod 117 repeat separation and contact, and which can cause abrasion. Preventing this abrasion is a new problem that arises because the anchor portion 118 and the rod 117 are formed separately and the anchor portion biasing spring 126 is provided. Particularly, in the flow-rate control valve according to the first embodiment of the present invention, the anchor portion 118 is formed of the movable portion 442 forming a magnetic path and the sliding portion 441 sliding on the rod 117. Then, the sliding portion 441 is subjected to surface treatment such as plating treatment, or heat treatment such as quenching treatment, to increase the hardness. With the above structure, it is possible to prevent deterioration of the magnetic property of the magnetic stainless steel material which is generated normally when the above-described high hardening treatment is applied to the entire anchor portion 118, and to suppress a decrease in the magnetic attraction force. In the case of plating treatment, treatment can be performed only to the sliding portion 441 by masking a portion unnecessary for the treatment. In the case of quenching treatment, methods such as high-frequency quenching, laser quenching, or partial carburizing quenching in which a carburizing agent is applied to a portion where the treatment is unnecessary can be used. By arranging the movable portion 442 to which the treatment is not necessary on the outer circumferential side, and the sliding portion 441 to which the treatment is necessary on the inner circumferential side separately, the partial high hardening treatment described above can be easily performed.

The functions of colliding and sliding with other members are integrated with the sliding portion 441 having increased hardness in this manner. As a result, it is possible to prevent abrasion caused by sliding and collision. In general, by using the structure in the present embodiment, it is possible to provide a highly reliable electromagnetic valve without lowering the magnetic attraction force, and a low-noise high-pressure fuel supply pump equipped with the electromagnetic valve. Furthermore, the flow-rate control valve 106 of the present invention is not limited to the high-pressure fuel pump main body 101, and an effect of improving responsiveness is obtained when the flow-rate control valve 106 is applied to an apparatus for controlling the flow rate such as an injector.

The position of the passage 460 in the axial direction may be provided on the fixed core side rather than the suction passage 404. The passage 460 and the suction passage 404 are formed so that the cross sections of the fuel passages overlap each other. With this structure, while a space for enclosing the suction valve 113, the suction valve seat 401, and the suction valve stopper 402 are enclosed in the high-pressure pump body without increasing the outer diameter of the high-pressure pump body, the fuel coming from the suction passage 404 flows in an oblique direction with respect to the passage 460, and it is possible to secure the cross-sectional area of the fuel passage.

In order to secure the sliding length of the guide portion 452 and the anchor rod 117, it is preferable that the sliding face of the guide portion 452 with the anchor rod 117 is extended to a position opposed to the passage 460 in the radial direction. With this structure, the sliding length can be secured, and it is possible to secure the strength against the abrasion of the sliding portion due to the sliding, and to suppress the inclination of the anchor portion 118. By suppressing the inclination of the anchor portion 118, the gap between the outer diameter of the anchor portion 118 and the inner diameter of the outer core 411 can be designed to be small, and it is possible to reduce the magnetic resistance and to improve the magnetic attraction force.

Second Embodiment

Figure 8:
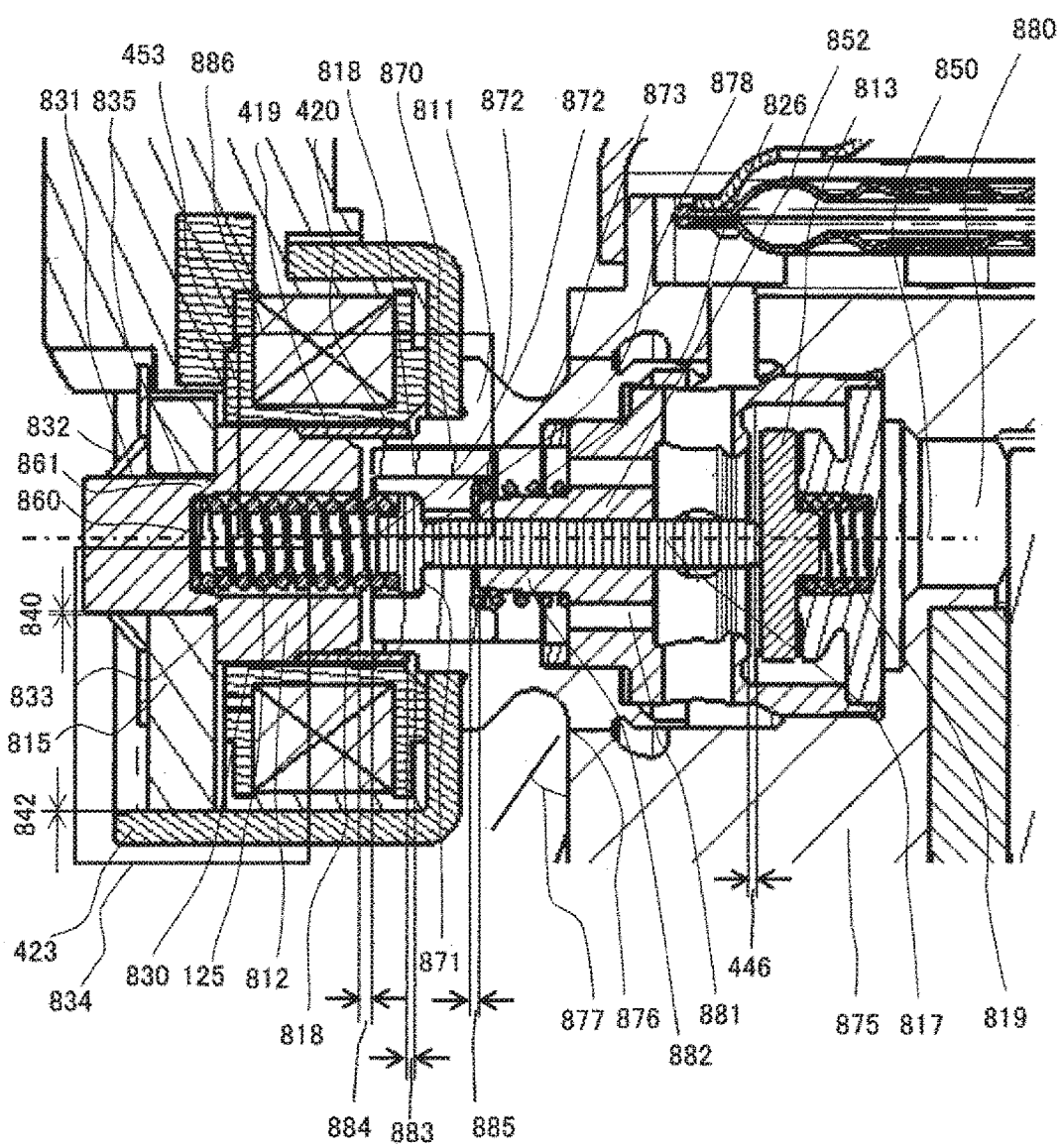
FIG. 8 is an enlarged cross-sectional view of a flow-rate control valve 106 of a high-pressure fuel supply pump in a second embodiment of the present invention.
Figure 9:
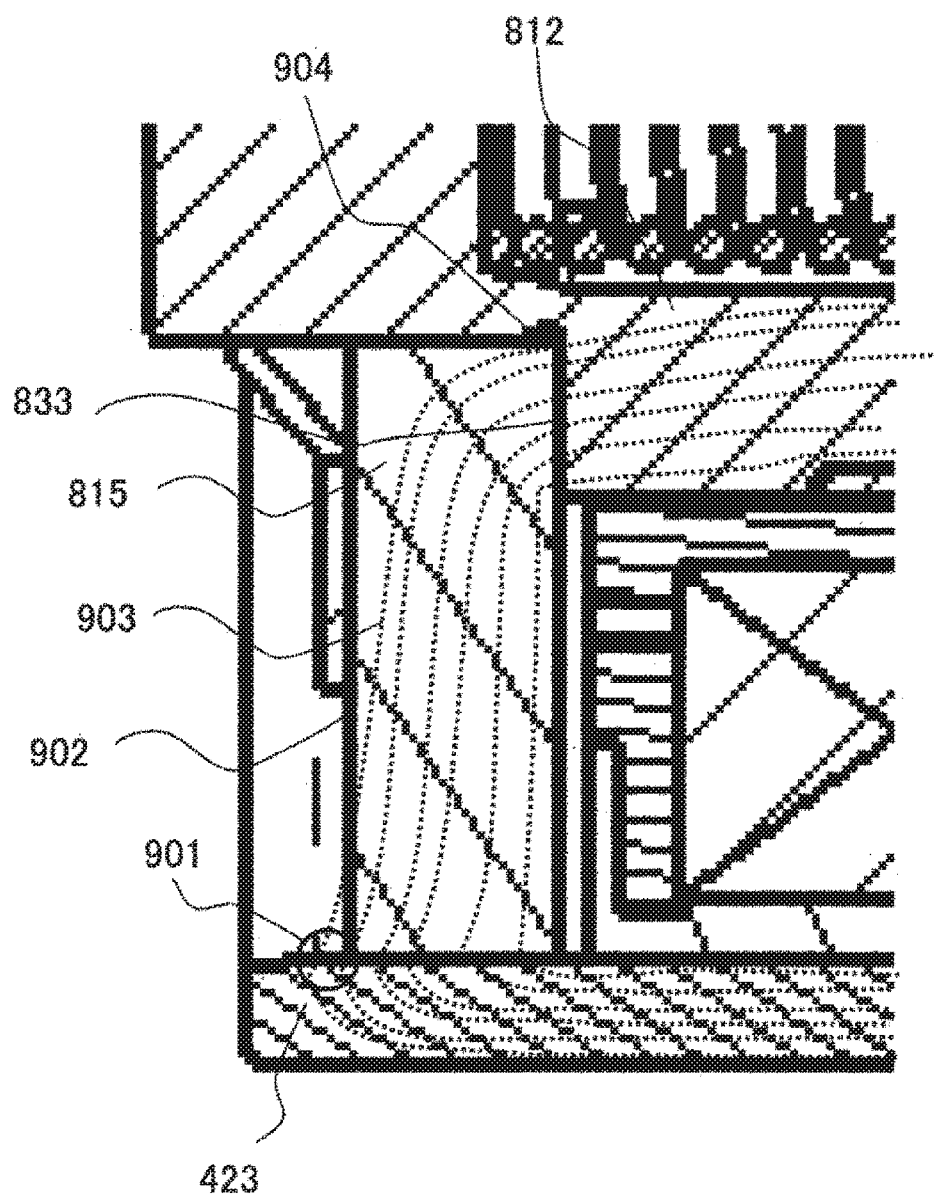
FIG. 9 is a diagram showing an enlarged portion 834 enlarging the vicinity of a cover portion 815, a yoke 423, and a fixed core 812 of the flow-rate control valve 106 in the second embodiment of the present invention.
Figure 10:
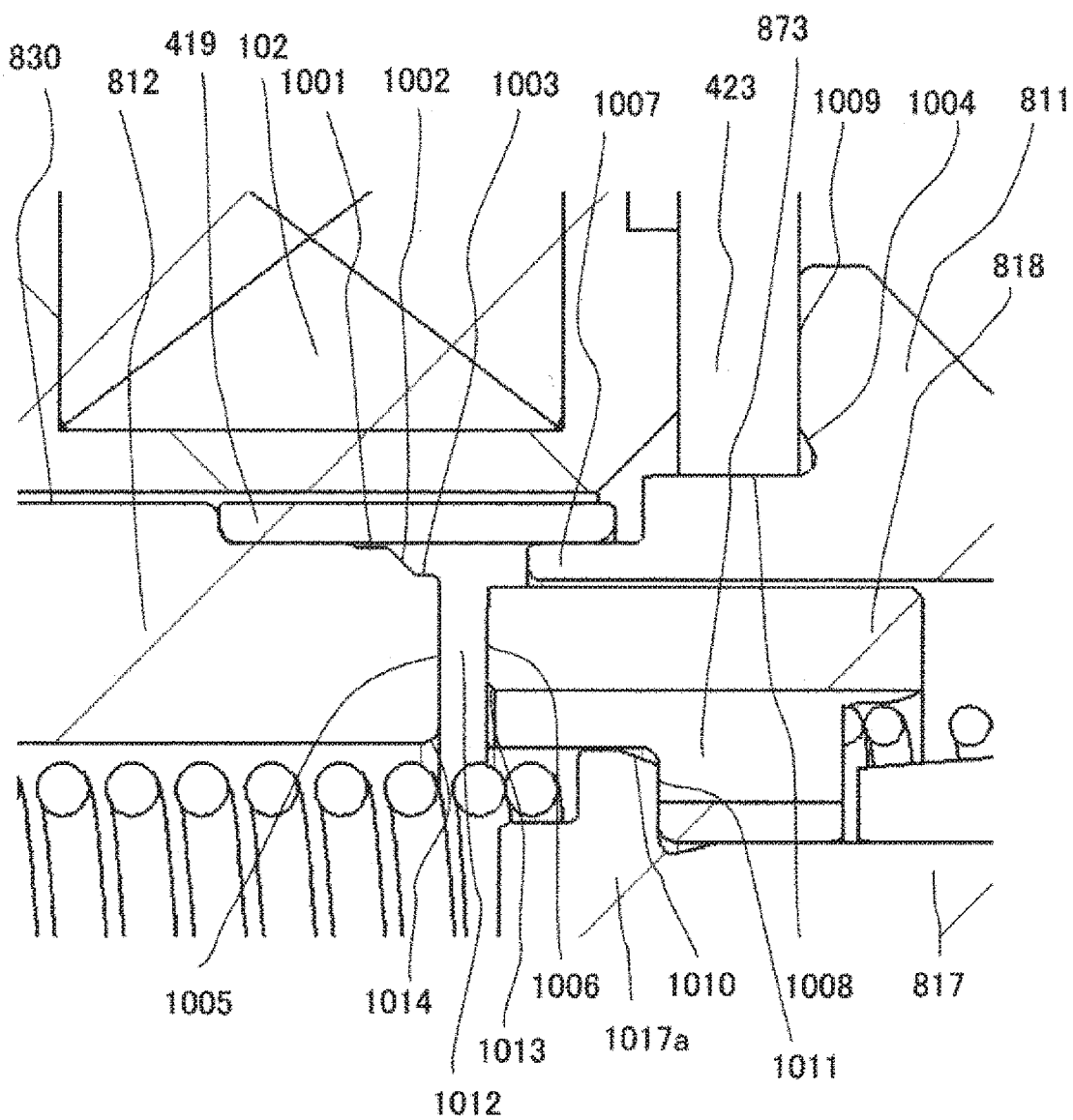
FIG. 10 is a diagram showing an enlarged portion 886 enlarging the vicinity of the cover portion 815, the fixed core 812, an anchor portion 818, and an outer core 811 of the flow-rate control valve 106 in the second embodiment of the present invention.

Next, with reference to FIGS. 8, 9 and 10, a structure of an electromagnetic flow-rate control valve 106 in a second embodiment of the present invention will be described. FIG. 8 is an enlarged view of the flow-rate control valve 106 in the second embodiment. In FIG. 8, the same reference signs are used for parts equivalent to those in FIGS. 1 and 4. FIG. 9 is an enlarged view of a cover portion 815, a fixed core 812, and a yoke 423 which are components of a magnetic circuit indicated by the enlarged portion 834 in FIG. 8. In FIG. 9, the magnetic flux lines generated in the magnetic circuit are shown by the dotted lines. In FIG. 9, the same reference signs are used for parts similar to those in FIGS. 4 and 8. FIG. 10 is an enlarged view of the enlarged portion 886 constituted by the cover portion 815, the fixed core 812, an anchor portion 818, and an outer core 811 in FIG. 8.

The difference from the solenoid valve in the first embodiment will be described below. The fixed core 812 is provided with an enlarged portion 830 which is in contact with the cover portion 815 in the axial direction and has an outer diameter enlarging toward the outer circumferential side of a solenoid 102, and is provided with a small diameter portion 831 the outer diameter of which is reduced. The cover portion 815 has an inner circumferential side opposing face 835 opposed to, in the radial direction, the small diameter portion 831 which is an end face on the outer circumferential side of the fixed core 812. The movable portion 442 and the sliding portion 441 in first embodiment are integrally formed in the second embodiment, and are referred to as the anchor portion 418.

The fixed core 812 is provided with the small diameter portion 831 on the outer side in the axial direction, that is, on the side opposite to the anchor portion 118. A fixing pin 832 is fixed to the small diameter portion 831 to press the cover portion 815 so as to be in contact with the outer diameter enlarged portion 830, and the movement of the cover portion 815 in the axial direction is thereby restricted.

A seal ring 818 is provided on a suction valve 113 side opposed to the enlarged portion 830 in the axial direction. The outer diameter of the enlarged portion 830 of the fixed core 812 is larger than the inner diameter of the seal ring 818. The seal ring 818 is press-fitted and fixed to an outer diameter portion 419 of the fixed core 412 and an outer diameter portion 420 of the outer core 411 to seal the fuel by, for example, being welded and joined. The seal ring 818 is provided at a position opposing a suction face 421 of the fixed core 412 and a movable core 118 in the radial direction to block the magnetic flow other than that between a movable core 117 and the fixed core 812 and to reduce the leakage magnetic flux. As a result, the magnetic flux flowing through the fixed core 812 and the movable core 118 increases, and the magnetic attraction force can be improved.

The guide portion 452 and the suction valve seat 401 in the first embodiment are integrally formed, and the member constituted by the guide portion 452 and the suction valve seat 401 is newly referred to as a guide portion 852.

Next, operations and effects in the structure of the flow-rate control valve in the second embodiment will be described.

As shown in FIG. 8, by bringing the cover portion 815 into contact with the enlarged portion 830, the magnetic gap between the cover portion 815 and the fixed core 812 is eliminated, and the magnetic resistance is reduced. As a result, the magnetic attraction force can increase, and the responsiveness of the anchor portion 418 is improved, whereby the responsiveness of the suction valve 813 is also improved. In particular, the magnetic flux which can be generated in the magnetic circuit increases as the magnetic resistance decreases, and the magnetic flux passing between the anchor portion 818 and the fixed core 812 also increases relatively.

According to the permeance method for replacing the magnetic circuit with an equivalent circuit, when it is assumed that the magnetic permeability of the magnetic material constituting the magnetic circuit is p, and that the cross-sectional area of the cross section through which the magnetic flux passes is S, the magnetic resistance R is obtained by the following expression (3).

[Expression 3]

$$R = \frac{\ell}{\mu \cdot S} \quad (3)$$

From expression (3), as the magnetic permeability p and the cross sectional area S are large, the magnetic resistance R decreases, and the number of magnetic flux which can be generated increases, whereby the magnetic attraction force can be improved. As a result, responsiveness when the anchor portion 118 is closed is improved, and the flow rate of the fuel injected by the injector 122 necessary for combustion can be secured. In the structure of the electromagnetic flow-rate control valve in the second embodiment, by providing the outer diameter enlarged portion 830, the cross-sectional area at which the cover portion 815 and the fixed core 812 are in contact with each other increases, and the magnetic resistance can be reduced. Since the magnetic gap between the cover portion 815 and the fixed core 812 can be reduced by bringing the cover portion 815 into contact with the fixed core 812 in the axial direction, the magnetic permeability between the fixed core 812 and the cover portion 815 is to be the magnetic permeability of the magnetic material constituting the cover portion 815 and the fixed core 812 from the magnetic permeability of a vacuum. As a result, the magnetic permeability increases, and the magnetic resistance can be reduced, whereby the magnetic attraction force can be improved. A gap 842 between the outer diameter of the cover portion 815 and the inner diameter of the yoke 423 is preferably to be smaller than a gap 840 between the inner diameter of the cover portion 815 and the small diameter portion 831 of the fixed core 812. Since magnetic flux tends to flow through a portion having a small magnetic resistance, the magnetic flux flowing from the fixed core 812 to the cover portion 815 hardly flows between the cover portion 815 and the small diameter portion 831, and easily flow to a contact face 833 of the fixed core 812 and the cover portion 815. Since the main path of the magnetic flux is between the cover portion 815 and the yoke 423, a large amount of magnetic flux generated in the magnetic circuit passes. Thus, by forming the magnetic gap between the cover portion 815 and the yoke 423 through which a large amount of magnetic flux passes to be small, the magnetic resistance can be reduced and the magnetic attraction force can be improved.

When the cover portion 815 is press-fitted and fixed to the small diameter portion 831, the load at the time of press fitting acts on the seal ring 418, and the seal ring 418 and the welded portion of the seal ring 418 can be deformed by the load at the time of press fitting. In particular, the stress tends to act on the welded portion between the seal ring 418 and the fixed core 812, and the welded portion between the seal ring 418 and an inner core 811.

According to the structure in the second embodiment of the present invention, since the pressing force is generated by the fixing pin 833 so that the cover portion 815 is regulated in the axial direction only by the outer diameter enlarged portion 830 of the fixed core 812, a large load at the time of press fitting does not act on the seal ring 418 and its welded portion, and the magnetic attraction force generated by the deformation of the seal ring 418 or deformation due to the load and the change in the movement amount of the anchor portion 118 suppresses the variation.

It is preferable to use a material having a higher magnetic property, particularly a higher saturation magnetic flux density, for the fixed core 812 and the anchor portion 418 as compared with the cover portion 815, the yoke 423, and the outer core 811. The fixed core 812 and the anchor portion 418 which are enclosed on the inner diameter side closer to the axial direction than the cover portion 815, the yoke 423, and the outer core 811 are difficult to geometrically secure the sectional area of the magnetic path, and can have a large magnetic resistance. Thus, by using a material having a better magnetic property for the fixed core 812 and the anchor portion 418 as compared with the cover portion 815, the yoke 423, and the outer core 811, the magnetic permeability p of the fixed core 812 and the anchor portion 418 is to be larger from the expression (3), and the magnetic resistance decreases, whereby the magnetic attraction force can be improved. The magnetic attraction force acting on the anchor portion 418 is expressed by expression (4) in a static state where there is no change in the current, and is obtained by the magnetic flux density B of the suction face of the anchor portion 418, the suction area S determined by the opposing area of the anchor portion 418 and the fixed core 812, and the vacuum permeability p0. Thus, by using the material having the highest saturation magnetic flux density for the fixed core 812 and the anchor portion 418, the magnetic attraction force can be improved and the responsiveness at the time of valve closing can be improved.

[Expression 4]

$$F_{mag} = \frac{B^2 \cdot S}{2\mu_0} \quad (4)$$

The portion where the main magnetic flux generated in the magnetic circuit passes through the air (in the fuel) is a face opposed to the anchor portion 418 at the fixed core 812, and a face opposed to the fixed core 812 and a side face 870 opposed to the outer core 811 in the radial direction at the movable portion 418. Since the outer core 811 has a larger area of the face opposed to the magnetic flux when the magnetic flux passes through the air for the cross-sectional area of the side face 870 as compared with the fixed core 812, a material having a higher magnetic property may be used for the anchor portion 418 rather than the fixed core 812.

It is preferable to use a material having a lower magnetic property for the anchor rod 817 than the anchor portion 818. Since the anchor rod 817 collides with the anchor portion 818 and the suction valve 813, and is required to have the mechanical strength in the material, particularly high hardness, it is preferable to use martensitic stainless steel such as SUS 420. The hardness of SUS 420 is increased by quenching, and magnetism is reduced by heat treatment. Thus, by performing quenching treatment to SUS 420 used for a guide portion 817, it is possible to achieve both improvement in hardness and reduction in magnetism. By reducing the magnetic property of the anchor rod 817, the magnetic flux leaking from the fixed core 812 toward the anchor rod 817 can be reduced, and the magnetic attraction force can be improved.

Since a material having a good magnetic property can be expensive normally, a material having a poor magnetic property is used for the cover portion 815, the yoke 423, and the outer core 811 as compared with the fixed core 812 and the anchor portion 418, and the cost of the flow-rate control valve 106 can be thereby reduced.

It is preferable to use a material having a better magnetic property for the outer core 811 as compared with the cover portion 815 and the yoke 423. Since the magnetic flux flowing from the side face 870 of the anchor portion 418 passes through the outer core 811, the magnetic resistance is improved so that the magnetic flux easily flows, whereby the magnetic resistance can be reduced. As a result, the magnetic attraction force is increased, and the responsiveness can be improved.

Next, the structure of the anchor portion 418 will be described. The anchor portion 418 is provided with a step 871 so that the step 871 is in contact with the end face on the suction valve 813 side of the anchor rod 817. At this time, the position of an end face 872 on the fixed core 812 side of the anchor rod 817 in the axial direction is preferably on the suction valve 813 side rather than the end face on the anchor portion 418 side of the fixed core 812. If the position of the end face 872 of the anchor rod 817 in the axial direction is on the cover portion 815 side rather than the end face on the anchor portion 418 side of the fixed core 812, the distance between the fixed core 812 and the end face 872 becomes short, and the magnetic flux leaks toward the anchor rod 817, and the magnetic attraction force decreases, whereby the responsiveness can be delayed. Thus, according to the structure in the second embodiment of the present invention, the magnetic flux which does not pass between the anchor portion 418 and the fixed core 812 and leaks to the anchor rod 817 can be reduced, and the responsiveness can be improved.

A pedestal face 878 of the anchor portion biasing spring 126 the inner diameter of which is reduced is provided on the end face on the suction valve 813 side of the anchor portion 418, and has a function for guiding the anchor portion biasing spring 126 in the radial direction. While the suction valve 813 is being opened, it is preferable that the position of the end face on the suction valve 813 side of the anchor portion 418 in the axial direction is to be on the suction valve 813 side rather than the end face on the fixed core 812 side of the guide portion 852. With this structure, it is possible to shift the components on the upstream side of the outer core 811 to the downstream side while the height of the anchor portion 418 and the sliding length of the guide portion 852 and the anchor rod 817 are secured, and the total length of the flow-rate control valve 106 is shortened, whereby the material cost can be suppressed. When the function for guiding the anchor portion biasing spring 126 in the radial direction is provided on the inner diameter of the outer core 811, by increasing the outer diameter of the anchor portion biasing spring 126, the pedestal of the anchor portion biasing spring 126 may be formed on the end face on the downstream side of the anchor portion 418. In this structure, since the anchor portion biasing spring 126 and a fuel passage 873 do not overlap each other in the radial direction, a large cross-sectional area of the fuel passage 873 can be secured. As a result, it is possible to suppress the cavitation caused by the rise in the pressure of the upper portion of the anchor portion 418 due to the excluded volume associated with the movement of the anchor portion 418. The structure of the guide portion 852 will be described. The guide portion 852 has a function for sliding with the anchor rod 817 and a function for sealing fuel between the suction valve 813. The guide portion 852 is provided with at least two fuel passages 881 on the circumference, and have a function for flowing the excluded volume associated with the movement of the anchor portion 418 to the downstream.

A pedestal face of the anchor portion biasing spring 826 is provided on the end face on the fixed core 812 side of the guide portion 852, and a guide portion 882 guiding the anchor portion biasing spring 826 is provided on the outer diameter. Since the inclination of the anchor portion biasing spring 826 can be suppressed by providing the guide portion 882, as a result, the moment with respect to the axial direction acting on the anchor portion 418 can be reduced, and the inclination of the anchor portion 418 can be suppressed. When the anchor portion 418 is inclined, the magnetic resistance of the anchor side gap becomes non-uniform in the circumferential direction with respect to the axis, and the magnetic attraction force can decrease. According to the structure in this embodiment, the inclination of the anchor portion 418 can be suppressed and the magnetic attraction force is increased, whereby the responsiveness can be improved.

It is preferable that the movement amount 446 of the suction valve 813 is set to be smaller than the movement amount 884 of the anchor portion 818, and that a gap 885 between the anchor portion 818 and the guide portion 882 is set to be smaller than the movement amount of the anchor portion 818. With this structure, the length of the sliding portion with the anchor rod 817 can be secured in the guide portion 882, and the inclination of the anchor portion 818 can be suppressed, whereby the magnetic attraction force can be improved. When the suction valve 813 is opened and the anchor rod 818 continues to move toward the suction valve 813 in the suction process from the discharge process, the gap 885 is preferably set so that the anchor portion 818 does not collide with the end face on the fixed core 812 side of the guide portion 882. By securing the gap 885 sufficiently, it is possible to reduce abnormal noises caused by collision of the anchor portion 818 against the guide portion 882. The end face opposed to the guide portion 882 of the anchor portion 818 and the face opposed to the anchor portion 818 of a guide portion 818 are preferably formed to be substantially planar. With this structure, when the anchor portion 818 comes close to the guide portion 882, the pressure between the anchor portion 818 and the guide portion 882 increases due to the excluded volume associated with the movement of the anchor portion 818, and a squeezing force which is the force in the valve closing direction of the suction valve 813 is generated at the anchor portion 818. Since the squeezing force generally increases in proportion to the cube of the gap 885, it increases as the anchor portion 818 comes closer to the guide portion 882, and the speed of the anchor portion 818 can be reduced. By reducing the speed of the anchor portion 818, the gap 885 can be set to be small, and the guide portion 882 can be extended toward the anchor portion 818, whereby the sliding length of the anchor rod 817 and the guide portion 882 can be large. The effect of increasing the sliding length is as described above.

The anchor portion 418 is provided with a fuel passage 872 for connecting the upstream of the anchor portion 418 with the downstream. Since the effect of providing the fuel passage 872 is the same as that in the first embodiment, a detailed description thereof is omitted. The fuel passage 872 is preferably provided at a position opposed to the inner diameter of the fixed core 812 in the axial direction, and two or more fuel passages 872 are preferably provided circumferentially with respect to the axis. It is preferable to design the sectional area in the radial direction between the outer diameter of the anchor portion 118 and the inner diameter of the outer core 811 (side gap) to be larger than the total sectional area of the fuel passage 872. Although the flow rate associated with the excluded volume of the anchor portion 418 flows separately to the fuel passage 872 and the side gap, when the gap between the anchor portion 418 and the fixed core 812 is smaller, the flow resistance of the space on the fixed core 418 side of the anchor portion 418 increases, and the fuel hardly flows to the inner diameter side, that is, the fuel passage 872 side. Thus, by increasing the cross-sectional area of the side gap rather than the total cross-sectional area of the fuel passage 872, it is possible to efficiently flow the fuel associated with the excluded volume to the downstream side, and the cavitation caused by rapid pressure change can be suppressed.

FIG. 9 is a diagram showing the magnetic flux lines when the magnetic attraction force is generated at the anchor portion 118 in the enlarged portion 834 of the flow-rate control valve of FIG. 8. In FIG. 9, the same reference signs are used for parts equivalent to those in FIG. 8. In the drawing, the magnetic flux lines passing through the fixed core 812, the cover portion 815, and the yoke 423 are indicated by dotted lines.

Referring to FIGS. 8 and 9, in the flow-rate control valve 106 in the first embodiment, the thickness of the cover portion 815 in the axial direction is preferably larger than the thickness of the yoke 423 in the radial direction. Geometrically, the magnetic path cross-sectional area is larger on the outer diameter side far from a center axis 850 than on the inner diameter side close to the center axis 850 of the solenoid 102. Thus, by making the thickness of the cover portion 815 in the axial direction, the cross-sectional area of which is geometrically smaller than that of the cover portion 815, larger than the thickness of the yoke 423 in the radial direction, the magnetic path cross-sectional area can be secured and the magnetic resistance can be reduced. As a result, the magnetic attraction force can be increased, and the responsiveness is improved, whereby the controllability of the flow rate is improved. When there is a gap between the outer diameter of the cover portion 815 and the inner diameter of the yoke 423, since the magnetic flux does not easily pass through the gap portion, the magnetic flux flowing from the cover portion 815 to the yoke 423 expands at the gap portion in the axial direction as indicated by the dotted line in FIG. 9. As a result, magnetic flux 903 passing through the vicinity of an end face 902 opposed to the fixed core 812 of the cover portion 815 cannot pass through the gap between the cover portion 815 and the yoke 423 as indicated by an enlarged portion 901, and can leak out in the air. Since the leakage magnetic flux passes through the air as shown in the expression (4), the magnetic permeability is smaller than that of the ferritic stainless steel constituting the cover portion 815, and the magnetic resistance increases. As a result, the magnetic attraction force acting on an anchor portion 117 decreases.

By making the thickness of the cover portion 815 in the axial direction larger than the thickness of the yoke 423 in the radial direction, the leakage magnetic flux passing through the air in the enlarged portion 901 can be reduced, and the magnetic attraction force can be improved.

It is preferable that the gap 840 between the inner circumferential side opposing face 835 opposed to the small diameter portion 831 of the fixed core 812 of the cover portion 815 and the outer circumferential side of the small diameter portion of the fixed core 812 is formed in a range of about 12 μm to 100 μm. When the position of the cover portion in the radial direction is defined by the outer diameter of the cover portion 815 and the inner diameter of the yoke 423, in order to suppress double press-fitting of the inner diameter and the outer diameter of the cover portion, it is preferable to provide a gap either at the inner diameter or the outer diameter of the cover portion 815 so that the position in the radial direction can be defined by either the inner diameter or the outer diameter of the cover portion 815. At this time, since a cover portion outer diameter 423 is the main path of the magnetic flux as compared with the inner diameter of the cover portion 815, it is preferable that the gap between the outer diameter of the cover portion 815 and the inner diameter of the yoke 423 is fitted or light-press fitted so that the gap between the outer diameter of the cover portion 815 and the inner diameter of the yoke 423 is to be small. In this case, it is preferable to provide the gap 840 in the range of about 12 μm to 100 μm, which is larger than 0, so that the inner diameter of the cover portion 815 is not brought into contact with the small diameter portion 831 of the fixed core 812. For example, when the position of the cover portion 815 in the radial direction is defined by the outer diameter of the cover portion 815 and the inner diameter of the yoke 423, it is necessary to define the position in consideration of the dimensional tolerance of the same axis of the cover portion 815, the inner diameter of the yoke 423, and the same axis of a stator 812 to secure the gap 840. When it is assumed that the same axis of the cover portion 815 is 0.01 mm, the inner diameter of the yoke 423 is 0.01 mm, and the same axis of the stator 812 is 0.02 as the minimum value of the dimensional tolerance in the case of common cutting work, the root mean square of each dimension is 0.02 mm, and it is necessary for the gap 840 on one side to secure 0.012 mm or more. When it is assumed that the same axis of the cover portion 815 is 0.05 mm, the inner diameter of the yoke 423 is 0.1 mm, and the same axis of the stator 812 is 0.05 as the maximum value of the dimensional tolerance, the simple sum of the dimensions is 0.2 mm, and it is necessary for the gap 840 on one side to secure 0.1 mm or more. Thus, by providing the gap 840 in the range of about 12 μm to 100 μm, the gap 840 between the inner diameter of the cover portion 815 and the outer diameter of the small diameter portion 831 is minimized while the position of the cover portion 815 in the radial direction is defined, and it is also possible to improve the magnetic attraction force. Although the effect will be described later, if a clearance 904 is not provided at the small diameter portion 831 of the fixed core 812, machining curvature R is formed at a corner portion of the contact face 833 between the small diameter portion 831 and the cover portion of the fixed core 812. In this structure, it is necessary to set the maximum value of the gap 840 in consideration of R. When R is R0.2 mm which is a general machine dimension, it is necessary to be set to 300 μm by adding 200 μm to the maximum value 100 μm of the gap 840.

If the gap 840 is too large, the magnetic resistance of the leakage magnetic flux passing through the gap 840 increases, and the magnetic attraction force decreases. In order to increase the gap 840, it is necessary to increase the inner diameter of the cover portion 815 or reduce the outer diameter of the small diameter portion 831 of the fixed core 812. In the above case, the contact area of the cover portion 815 and the fixed core 812 is reduced, and the magnetic attraction force can decrease. In the case to be described later, the thickness of the inner diameter of the small diameter portion 831 and the inner diameter of a spring chamber 860 becomes small, and it is difficult to secure the strength of the fixed core 812. Thus, by setting the maximum value of the gap 840 within the range of 100 μm or less, it is possible to improve the magnetic attraction force and to secure the strength of the fixed core 812.

The clearance 904 is preferably provided at the small diameter portion 831 of the fixed core 812. When the clearance 904 is not provided at the fixed core 812, machining curvature R is formed at the corner portion between the small diameter portion 831 and the contact face. As a result, in order to bring the cover portion 815 into contact with the fixed core 812, it is necessary to provide a gap according to the diameter of the curvature R between the small diameter portion 831 and the inner circumferential side opposing face of the cover portion 815 so that the inner circumferential side opposing face of the cover portion 815 and the fixed core 812 do not interfere with each other if the curvature R is formed at the corner portion. When a large amount of magnetic flux is generated in the magnetic circuit, the magnetic flux cannot pass through the contact face 833, and can pass between the small diameter portion 831 and the inner circumferential side opposing face of the cover portion 815. By providing the clearance 904 at the small diameter portion 831, the gap between the small diameter portion 831 and the inner circumferential side opposing face of the cover portion 815 can be reduced. By reducing the magnetic resistance between the small diameter portion 831 and the inner circumferential side opposing face of the cover portion 815, the magnetic attraction force acting on the anchor portion 118 can be improved. As a result, the responsiveness when the suction valve 113 is closed from the valve opening state can be improved.

The position of the pedestal face 860 of the rod biasing spring 125 provided at the fixed core 812 in the axial direction is preferably on the upstream side of the contact face 833 of the cover portion 815 and the fixed core 812, that is, in the direction opposite to the suction valve 113. As described in the first embodiment, when a large flow rate is required, the flow speed of the fuel passing through the outer diameter of the suction valve 113 increases, and the fluid force acting on the suction valve 113 in the valve closing direction increases. As a result, if the resultant force of the rod biasing spring 125, an anchor spring 826, and a suction valve spring 119 is smaller than the fluid force, the suction valve 813 is closed at an unintended timing, and the required maximum flow rate cannot be secured. In order to prevent the suction valve 813 from closing, it is necessary to decrease the flow speed of the fuel by increasing the movement amount 446 of the suction valve 813 in the axial direction and ensuring the flow passage cross-sectional area of a suction valve seat portion 405 or to design the rod biasing spring 125 to have strong load. When the movement amount 446 is increased, the displacement amount of the rod biasing spring 125 also increases, it is necessary to increase the total length of the rod biasing spring 125 so that the spring is not brought into contact when the rod biasing spring 125 is displaced.

By setting the position of the pedestal face 860 of the rod biasing spring 125 provided at the fixed core 812 in the axial direction to be on the upstream side of the contact face 833 of the cover portion 815 and the fixed core 812, it is possible to secure a gap for housing the rod biasing spring 125 and to keep the suction valve 113 in the valve opening state when the flow rate becomes large. As a result, it is possible to increase the flow rate supplied to the injector 122, to handle the high output of the engine requirement, and to maintain the required output in the case of using ethanol blended fuel. It is preferable that the outer diameter of the small diameter portion 831 of the fixed core 812 is larger than the inner diameter of the portion enclosing the rod biasing spring 125 of the fixed core 812. As a result, it is possible to secure a thickness 861 of the small diameter portion 831 and the inner diameter of the fixed core, and to secure the necessary strength when the spring load of the rod biasing spring 125 or the load by the fixing pin 832 acts on the fixed core 812.

The end face on the cover portion 815 side of the seal ring 818 is in contact with the fixed core 812, and a gap 885 is preferably provided between the end face on the suction valve 813 side of the seal ring 818 and the outer core 811. With this structure, when the seal ring 419 is press-fitted into the outer core 811 after the seal ring 419 is press-fitted into the fixed core 812, by adjusting the press-fitting depth of the seal ring 419, the displacement amount 884 of the movable portion 818 can be adjusted. By decreasing the displacement amount 884, the distance between the fixed core 812 and the anchor portion 818 is reduced, and the magnetic attraction force is improved. By setting the movement amount 884 of the movable portion 818 to be larger than the displacement amount 446 of the suction valve 813, it is possible to reliably close the suction valve 813. When the displacement amount 884 is adjusted by the gap 883 between the seal ring 419 and the outer core 811, the movement amount 446 of the suction valve 813 is measured in advance, and the gap 833 is determined so as to be the maximum value of the movement amount 446 and the dimensional tolerance variation.

The gap 885 may be provided between the fixed core 812 and the seal ring 419. In this case, it is preferable that the end face on the suction valve 813 side of the seal ring 419 is brought into contact with the end face on the fixed core 812 side of the outer core 811. By bringing one end face of the seal ring 419 into contact with the fixed core 812 or the outer core 811, it is possible to minimize the deformation due to the thermal influence during the welding of the seal ring 419, and to adjust the displacement amount 884.

It is preferable to provide a recess 874 the outer diameter of which is reduced at the outer diameter of the outer core 811. The outer core 811 is welded and fixed to a body 875 of the high-pressure fuel pump at a welded portion 876. Since an incidence angle 877 of the welding machine can be secured by providing the recess 874, it is possible to stably weld the welded portion 876, and the strength of the welded portion is improved, whereby the reliability is enhanced.

Next, the structures of the fixed core 812, the anchor portion 818, and the outer core 811 will be described in detail with reference to FIG. 10. It is preferable to provide a flat portion 1003 parallel to the axis on the outer diameter of a suction face 1005 of the fixed core 812, and an outer diameter reduced portion 1002 the outer diameter of which is reduced as compared with the outer diameter enlarged portion 830 at upstream of a flat portion 1002. From expression (4), the magnetic attraction force is proportional to the square of the magnetic flux density of the suction face 1005. In the fixed core 812, the magnetic path cross-sectional area is secured by the enlarged portion 830 and the magnetic resistance is reduced. In the second embodiment, in order to improve the magnetic flux density of the suction face 1005, by providing the outer diameter reduced portion 1002 the outer diameter of which is reduced in the vicinity of the suction face 1005, the magnetic resistance is reduced, and the magnetic flux density of the suction face 1005 can be improved. As a result, the magnetic attraction force increases, and it is possible to improve the responsiveness when the valve is closed. Although the magnetic flux passing in the vicinity of the outer diameter reduced portion 1002 flows obliquely with respect to the axial direction, the flow of the magnetic flux flowing through the outer diameter reduced portion 1002 is changed so as to be along the axial direction by providing the flat portion 1003, and passes in a direction perpendicular to a suction face 1006 of the anchor portion 818. As the magnetic flux passes perpendicularly to the suction face 1006, the magnetic flux passes through the shortest distance, and the magnetic resistance decreases, whereby the magnetic attraction force can be improved. By providing the flat portion 1003 and the outer diameter reduced portion 1002, it is possible to suppress the magnetic flux leaking from the suction face 1005 of the fixed core 812 to a protruding portion 1007 in contact with the seal ring 419 of the outer core 811. As a result, the magnetic flux passing through the suction face 1005 increases, and the magnetic attraction force increases.

It is preferable to provide an enlarged portion 1014 the inner diameter of which is enlarged toward the suction face 1005 on the inner diameter of the fixed core 812. By locally reducing the suction area of the suction face 1005 by the enlarged portion 1014, the magnetic flux density of the suction face 1005 is improved, and the magnetic attraction force can be improved. In order to secure the cross sectional area of the fuel passage of the anchor portion 818, the inner diameter of the anchor portion 818 may be increased. However, if the inner diameter of the anchor portion 818 is smaller than the inner diameter of the fixed core 812, the magnetic flux passing in the vicinity of the inner diameter of the fixed core 812 passes obliquely with respect to the suction face 1006 of the anchor portion 818, and the passing distance of the upper space 1012 which is the vacuum permeability increases, whereby the magnetic resistance can increase. By providing the enlarged portion 1014 on the inner diameter of the fixed core 812, it is possible to increase the magnetic attraction force and to improve the responsiveness. By providing the enlarged portion 1014 and the outer diameter reduced portion 1002, a synergistic effect of increasing the magnetic attraction force can be obtained.

The position of the enlarged portion 1014 in the axial direction is preferably on the suction valve 813 side rather than the outer diameter reduced portion 1002. At the outer diameter of the fixed core 812, the sectional area change of the enlarged portion 1014 of the inner diameter of the fixed core 812 is smaller as compared with the sectional area change by the difference between the inner diameter of the seal ring 419 and the outer diameter of the suction face 1005 from the inner diameter of the seal ring 419 toward the suction face 1005. Thus, the position of the enlarged portion 1014 in the axial direction has an effect of narrowing the cross-sectional area of the suction face 1005 although it is positioned on the suction valve 813 side rather than the outer diameter reduced portion 1002, and the magnetic attraction force can be improved.

It is preferable that the outer diameter of the enlarged portion 830 is set to be slightly larger than the outer diameter of the seal ring 419. When the seal ring 419 and the fixed core 812 are welded, the outer diameter of the welded portion is slightly larger. Thus, by determining the position in the radial direction of the bobbin 453 of the solenoid 102 according to the outer diameter of the enlarged portion 830, it is possible to accurately determine the positions of the fixed core 812 and the anchor portion 818 in the radial direction, and to suppress the reduction in the magnetic attraction force due to the displacement of the position of the solenoid 102.

When the outer diameter of the enlarged portion 830 is set to be smaller than the outer diameter of the seal ring 419, or when the outer diameter of the enlarged portion 830 and the outer diameter of the seal ring are set to the same dimension in the drawing, a recess the outer diameter of which is reduced is preferably provided at the outer diameter of the welded portion of the seal ring 419. With this structure, when the seal ring 419 is welded, the outer diameter after welding can be suppressed to be smaller than the outer diameter of the seal ring 419, and the position of the solenoid 102 can be accurately determined.

A clearance portion 1004 is preferably provided on an end face 1009 opposed to the yoke 423 of the outer core 811. The yoke 423 is press-fitted and fixed to a press-fitting portion 1008 of the outer core 811, but the end face 1009 on the yoke 423 side of the outer core 811 can bring into contact with the end face on the end face 1009 side of the yoke 423 by the clearance portion 1004 at the time of press-fitting. The magnetic flux passing from the side face of the anchor portion 818 toward the outer core 811 passes through the press-fitting portion 1008, but the inner diameter of the yoke 423 has a geometrically smaller sectional area than the outer diameter, and the magnetic flux which cannot pass through the press-fitting portion 1008 passes through the end face 1009. If there is a gap between the end face 1009 and the yoke 423, the magnetic resistance increases and the magnetic attraction force decreases. According to the structure in the second embodiment, by bringing the end face 1009 into contact with the yoke 423 by the clearance portion 1004, the magnetic attraction force can be increased and the responsiveness can be improved.

It is preferable to provide, on the outer diameter of the flange portion 1017a of the anchor rod 817, an inclined face 1010 whose the outer diameter toward a contact face 1011 with the anchor portion 818 is reduced. When the anchor portion 818 moves toward the fixed core 812, the excluded volume associated with the movement of the anchor portion 818 passes through the fuel passage 873 and the side face of the anchor portion 818. The fuel passing through the fuel passage 873 flows from an upper space 1012 of the suction face 1006 of the anchor portion 818 toward the fuel passage 873. However, the flow speed of the fuel flowing through the flange portion 1017a is increased after the cross sectional area of the fuel passage 873 is locally reduced by the flange portion 1017a, and exfoliation occurs in the downstream of the flange portion 1017a, whereby cavitation erosion can occur. By providing the inclined face 1010, the cross sectional area of the fuel passage gradually increases from the flange portion 1017a to the downstream, and the flow speed which has increased at the flange portion can be reduced toward the downstream, whereby the cavitation due to the exfoliation can be suppressed. As a result, it is possible to suppress the abrasion of the contact face of the anchor rod 817 and the anchor portion 818 by cavitation erosion, and to change the magnetic attraction force by the change of the movement amount 884 of the anchor portion 818. If the inclined face 1010 is formed with a taper or a curvature including R, an equivalent effect can be obtained. An inclined face 1013 is preferably provided at the inlet of the fuel passage 873 of the anchor portion 818. By providing the inclined face 1013, it is possible to suppress the cavitation erosion caused by exfoliation at the inlet of the fuel passage 873 due to the fuel flowing from the upper space 1012. The effect of suppressing the cavitation erosion can be obtained similarly when the hole diameter of the fuel passage 873 is increased, but the suction area is reduced by the fuel passage, and the magnetic attraction force decreases. In the second embodiment of the present invention, by providing the inclined face 1010 and the inclined face 1013, it is possible to maintain the magnetic attraction force while cavitation erosion is suppressed. Note that, the inclined face 1013 is preferably formed with a taper, a curvature including R, or a taper and curvature including R.

Third Embodiment

Figure 11:
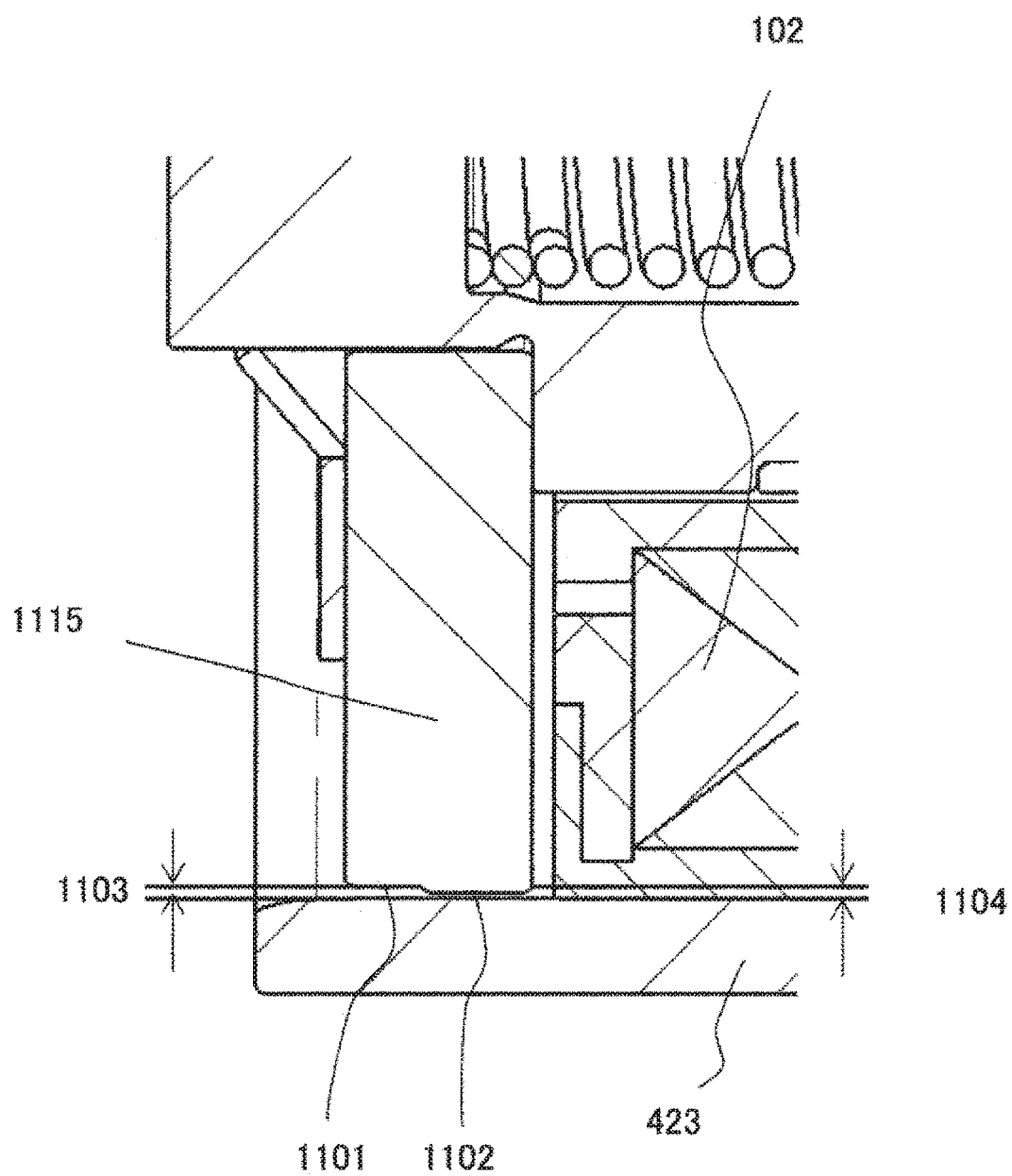
FIG. 11 is a diagram enlarging the vicinity of a cover portion 1115, a yoke 423, and a fixed core 812 of a flow-rate control valve 106 in a third embodiment of the present invention.

Next, with reference to FIG. 11, a structure of an electromagnetic flow-rate control valve 106 in a third embodiment of the present invention will be described. FIG. 11 is an enlarged view of a cover portion 815, a fixed core 812, and a yoke 423 which are components of a magnetic circuit in the third embodiment. In FIG. 11, the same reference signs are used for parts equivalent to those in FIGS. 1 and 8.

The difference in the third embodiment from the flow-rate control valve 106 in the second embodiment will be described. In the third embodiment, a cover portion 1115 is formed by pressing. In the case of press molding, punching is performed so that the cover portion 1115 is formed from a plate material to have the outer diameter and the inner diameter dimensions, and it can be processed in shorter time than cutting, which has an advantage of reducing the cost.

When the cover portion 1115 is molded by a press, a fractured face 1101 in which the outer diameter becomes smaller is formed at the outer diameter of the cover portion 1115 by cracks occurring in the material, and a shearing face 1102 in which the outer diameter is to be substantially the same as a die is formed at the time of punching the diameter of the cover portion 1115 with the die. When the fractured face 1101 is formed, a gap 1103 between the inner diameter of the yoke 423 and the fractured face 1101 becomes larger than a gap 1104 between the inner diameter of the yoke 423 and the shearing face 1102. When the fractured face 1101 is formed, it is preferable to adjust the direction of the cover portion 1115 so that a shearing face 1101 is positioned on a solenoid 102 side. The magnetic flux has a property of easily flowing to a portion where the magnetic resistance is small, and as shown in expression (5), the internal magnetic field Hin of the magnetic circuit is proportional to the product of the current A and the number of turns T of the solenoid 102, and is inversely proportional to the length l of the magnetic path through which the magnetic flux passes. Thus, when the magnetic flux passes through the magnetic material close to the solenoid 102, the length of the magnetic path becomes shorter, and the internal magnetic field Hin generated in the magnetic circuit becomes larger. As a result, the magnetic flux generated in the magnetic circuit increases and the magnetic attraction force increases, whereby the responsiveness of an anchor portion 818 improves.

[Expression 5]

$$H = \frac{A \cdot T}{\ell} \quad (5)$$

When the cover portion 1115 is pressed with a die, if the clearance between the die and the outer diameter of the cover portion 1115 is small, secondary shearing can occur. In this case, since sagging due to pressing occurs on the fractured face 1101 side, the outer diameter becomes smaller than the shearing face 1102. Thus, by adjusting the direction of the cover portion 1115 so that the shearing face 1102 comes to the solenoid 102 side, the attraction force increases as described above, and the responsiveness of the anchor portion 815 can be improved.

REFERENCE SIGNS LIST 101 pump main body
108 plunger
122 injector
123 engine control unit (ECU)
125 rod biasing spring
126 anchor portion biasing spring
102 solenoid
106 flow-rate control valve
114 pressurizing chamber
115 discharge valve mechanism
201 cylinder
313 seal holder
202 pressure pulsation reducing mechanism
10a low-pressure fuel suction port
12 fuel discharge port
314 plunger seal
113 suction valve
405 suction valve seat
441 sliding portion
119 suction valve spring
117 anchor rod
118 anchor portion
415 cover portion 423 yoke
418 seal ring
442 movable portion
441 sliding portion
411 outer core
412 fixed core
1101 fractured face
1102 shearing face

The invention claimed is:

1. An electromagnetic flow-rate control valve comprising:
a fixed core arranged on an inner circumferential side of a coil, the fixed core having a small diameter portion and a large diameter portion, that is larger than the small diameter portion, the large diameter portion being defined by an enlarged portion of the fixed core;
a cover portion positioned at an outer side along an axial direction of the electromagnetic flow-rate control valve; and
a yoke that is disposed radially outward relative to the cover portion, wherein
the fixed core has the enlarged portion in contact with the cover portion in the axial direction,
the cover portion has an inner circumferential side opposing face opposed to an outer circumferential side of the fixed core,
an inner side of the cover portion in the axial direction makes contact with the fixed core having the enlarged portion, and
along a radial direction, gaps are provided between: i) the cover portion and the yoke, and ii) the cover portion and the small diameter portion.

2. The flow-rate control valve according to claim 1, wherein
a thickness of the cover portion in the axial direction is larger than a thickness of the yoke in a radial direction.

3. The flow-rate control valve according to claim 1, wherein
the cover portion has an outer circumferential side opposing face opposed to an inner circumferential portion of the yoke.

4. The flow-rate control valve according to claim 3, wherein
the inner circumferential side opposing face of the cover portion is arranged with one of the gaps from the outer circumferential side of the fixed core, and the outer circumferential side opposing face of the cover portion is arranged with one of the gaps from the inner circumferential portion of the yoke.

5. The flow-rate control valve according to claim 4, wherein
the one of the gaps between the inner circumferential side opposing face of the cover portion and the outer circumferential side of the fixed core is formed to be larger than the one of the gaps between the outer circumferential side opposing face of the cover portion and the inner circumferential portion of the yoke.

6. The flow-rate control valve according to claim 4, wherein
the one of the gaps between the inner circumferential side opposing face of the cover portion and the outer circumferential side of the fixed core is formed to be between 12 μm to 100 μm.

7. The flow-rate control valve according to claim 1, wherein
the fixed core has a cover-side opposing face opposed to the cover portion, and a mover-side opposing face opposed to a mover.

8. The flow-rate control valve according to claim 1, wherein
the small diameter portion is formed to be opposed to the inner circumferential side opposing face of the cover portion on an outer circumferential side of the small diameter portion.

9. The flow-rate control valve according to claim 7, further comprising:
a spring portion biasing the mover in a valve opening direction, wherein
the fixed core is formed to hold the spring portion in a space formed on an inner circumferential side and is formed such that a diameter of the small diameter portion is larger than a diameter of the space of the fixed core.

10. The flow-rate control valve according to claim 1, wherein
a fixing pin biasing the cover portion so as to contact with the fixed core in the axial direction is fixed at the small diameter portion of the fixed core, the fixed core has the small diameter portion on an outer side in an axial direction and is formed to be opposed to the inner circumferential side opposing face of the cover portion on the outer circumferential side of the small diameter portion, and the fixed core is formed to hold a spring portion in a space formed on an inner circumferential side and is formed such that a diameter of the small diameter portion is larger than a diameter of the space of the fixed core.

11. A high-pressure fuel supply pump comprising:
a pressurizing chamber configured to pressurize fuel;
a discharge valve arranged on an outlet side of the pressurizing chamber and discharging fuel;
a suction valve arranged on an inlet side of the pressurizing chamber and feeding fuel to the pressurizing chamber; and
a plunger capable of reciprocating in the pressurizing chamber, wherein
the suction valve is the flow-rate control valve according to claim 1.

12. A flow-rate control valve comprising:
a fixed core arranged on an inner circumferential side of a coil;
a cover portion positioned at an outer side along an axial direction of the electromagnetic flow-rate control valve;
a yoke that is disposed radially outward relative to the cover portion;
a mover opposed to a stator and arranged adjacent to the cover portion; and a spring portion biasing the mover against the fixed core, wherein
the fixed core has a small diameter portion on an outer side in an axial direction and is formed to be opposed to an inner circumferential side opposing face of the cover portion on an outer circumferential side of the small diameter portion,
the fixed core also has a large diameter portion that is axially adjacent from the small diameter portion,
the fixed core is formed to hold the spring portion in a space formed on an axial face of the fixed core and is formed such that a diameter of the small diameter portion is larger than a diameter of the space of the fixed core, and
along a radial direction, gaps are provided between: i) the cover portion and the yoke, and ii) the cover portion and the small diameter portion.

13. The flow-rate control valve according to claim 12, wherein
a thickness of the cover portion in the axial direction is larger than a thickness of the yoke in a radial direction.

14. The flow-rate control valve according to claim 12, wherein
the fixed core has a cover-side opposing face opposed to the cover portion, a mover-side opposing face opposed to the mover.

15. The flow-rate control valve according to claim 12, wherein
a fixing pin biasing the cover portion so as to contact with the fixed core in the axial direction is fixed at the small diameter portion of the fixed core, and the fixed core is formed to hold the spring portion in a space formed on an inner circumferential side and is formed such that a diameter of the small diameter portion is larger than a diameter of the space of the fixed core.

16. A high-pressure fuel supply pump comprising:
a pressurizing chamber configured to pressurize fuel;
a discharge valve arranged on an outlet side of the pressurizing chamber and discharging fuel;
a suction valve arranged on an inlet side of the pressurizing chamber and feeding fuel to the pressurizing chamber; and
a plunger capable of reciprocating in the pressurizing chamber, wherein
the suction valve is the flow-rate control valve according to claim 12.

17. A flow-rate control valve constituting a magnetic circuit, the flow-rate control valve comprising:
a fixed core arranged on an inner circumferential side of a coil;
a cover portion positioned at an outer side along an axial direction of the electromagnetic flow-rate control valve; and
a yoke arranged on an outer circumferential side of the coil, wherein
the yoke is joined to another member by being press-fit or welded at an end portion of the yoke on an opposite side of the cover portion, the fixed core has a contact portion in contact with the cover portion in an axial direction, and the cover portion is in contact with the yoke in a radial direction,
the fixed core has a small diameter portion and a large diameter portion, that is larger than the small diameter portion, the large diameter portion axially adjacent from the small diameter portion, and
along a radial direction, gaps are provided between: i) the cover portion and the yoke, and ii) the cover portion and the small diameter portion.

18. An electromagnetic flow-rate control valve comprising:
a fixed core arranged on an inner circumferential side of a coil, the fixed core having a small diameter portion and a large diameter portion, that is larger than the small diameter portion, the large diameter portion being defined by an enlarged portion of the fixed core;
a cover portion positioned at an outer side along an axial direction of the electromagnetic flow-rate control valve; and
a yoke that is disposed radially outward relative to the cover portion, wherein
the fixed core has the enlarged portion in contact with the cover portion in the axial direction,
the cover portion has an inner circumferential side opposing face opposed to an outer circumferential side of the fixed core,
an inner side of the cover portion in the axial direction makes contact with the fixed core having the enlarged portion, and
a fixing pin biasing the cover portion so as to contact with the fixed core in the axial direction is fixed at the small diameter portion of the fixed core.

* * * * *